US010457210B2

(12) United States Patent
Leem et al.

(10) Patent No.: US 10,457,210 B2
(45) Date of Patent: Oct. 29, 2019

(54) AUTONOMOUS VEHICLE

(71) Applicant: LG ELECTRONICS INC., Seoul (KR)

(72) Inventors: Chaewah Leem, Seoul (KR); Junyoung Yu, Seoul (KR); Taekyung Lee, Seoul (KR); Hyunseok Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/824,264

(22) Filed: Nov. 28, 2017

(65) Prior Publication Data

US 2018/0147988 A1     May 31, 2018

(30) Foreign Application Priority Data

Nov. 29, 2016 (KR) .......................... 10-2016-0160288

(51) Int. Cl.
*B60R 1/00* (2006.01)
*G05D 1/00* (2006.01)
(Continued)

(52) U.S. Cl.
CPC ............... *B60R 1/00* (2013.01); *B60W 50/14* (2013.01); *G01C 21/3685* (2013.01); *G01C 21/3697* (2013.01); *G05D 1/0088* (2013.01); *G08G 1/012* (2013.01); *G08G 1/0112* (2013.01); *G08G 1/0133* (2013.01); *B60K 2370/115* (2019.05); *B60K 2370/177* (2019.05); *B60R 2300/205* (2013.01); *B60R 2300/207* (2013.01); *B60R 2300/308* (2013.01); *B60W 2050/146* (2013.01);
(Continued)

(58) Field of Classification Search
CPC ............... B60R 1/00; B60R 2300/205; B60R 2300/207; B60R 2300/308; B60W 2050/146; B60W 2540/04; B60W 2550/00; B60W 2750/40; B60W 50/14; G01C 21/3685; G01C 21/3697; G05D 1/0088; G05D 1/0212; G08G 1/0112; G08G 1/012; G08G 1/0133; H04W 4/70
See application file for complete search history.

(56) References Cited

U.S. PATENT DOCUMENTS 8,315,796 B2 * 11/2012 Yamaguchi ............ G01C 21/36
                                                340/995.2
9,194,168 B1 * 11/2015 Lu .......................... E05F 15/70
(Continued)

FOREIGN PATENT DOCUMENTS

DE   10-2013-213171 A1   1/2015
EP        3072710 A1     9/2016
(Continued)

*Primary Examiner* — Tyler J Lee
(74) *Attorney, Agent, or Firm* — Birch, Stewart, Kolasch & Birch, LLP

(57) ABSTRACT

Disclosed is an autonomous vehicle including a display unit and a controller which is configured to: obtain vehicle driving information, in a state in which (i) the vehicle moves within a first distance from a destination or (ii) the vehicle receives a stop request while the vehicle is travelling, search for at least one available stopping area based on the vehicle driving information, and display information about the at least one available stopping area on the display unit or transmit the information to a terminal.

20 Claims, 32 Drawing Sheets

(51) Int. Cl.
*G08G 1/01* (2006.01)
*B60W 50/14* (2012.01)
*G01C 21/36* (2006.01)
*H04W 4/70* (2018.01)

(52) U.S. Cl.
CPC ..... *B60W 2540/04* (2013.01); *B60W 2550/00* (2013.01); *B60W 2750/40* (2013.01); *H04W 4/70* (2018.02)

(56) References Cited

U.S. PATENT DOCUMENTS

| | | | |
|---|---|---|---|
| 9,613,386 B1* | 4/2017 | Arden | G06Q 50/30 |
| 10,180,332 B2* | 1/2019 | Yu | G01C 21/3423 |
| 2010/0161128 A1* | 6/2010 | Choi | G08G 1/142 |
| | | | 700/258 |
| 2012/0062743 A1* | 3/2012 | Lynam | B60Q 9/005 |
| | | | 348/148 |
| 2015/0346727 A1 | 12/2015 | Ramanujam | |
| 2016/0019790 A1 | 1/2016 | Tobolski et al. | |
| 2016/0125736 A1 | 5/2016 | Shaik | |
| 2016/0365068 A1* | 12/2016 | Sakaguchi | G09G 5/10 |
| 2017/0154530 A1* | 6/2017 | Irion | G01C 21/3685 |
| 2017/0351267 A1* | 12/2017 | Mielenz | B60W 30/06 |
| 2018/0050689 A1* | 2/2018 | Unveren | B60W 30/06 |
| 2018/0336784 A1* | 11/2018 | Liu | G08G 1/143 |

FOREIGN PATENT DOCUMENTS

| | | |
|---|---|---|
| JP | 2004-361325 A | 12/2004 |
| JP | 2009-162567 A | 7/2009 |
| JP | 2011-209779 A | 10/2011 |
| JP | 2012-48563 A | 3/2012 |
| JP | 6316706 B2 | 10/2013 |
| JP | 2014-65342 A | 4/2014 |
| JP | 2016-45628 A | 4/2016 |
| JP | 2016-124393 A | 7/2016 |
| KR | 10-2014-0142993 A | 12/2004 |
| KR | 10-2012-0045960 A | 5/2012 |
| KR | 10-2015-0070832 A | 6/2015 |
| WO | WO 2015/137012 A1 | 9/2015 |
| WO | WO 2016/092796 A1 | 6/2016 |

* cited by examiner (a) WHEN DISEMBARKING LOCATION IS ON RIGHT REAR SIDE (b) WHEN DISEMBARKING LOCATION IS ON FRONT LEFT SIDE (a)

(b)

AUTONOMOUS VEHICLE

CROSS-REFERENCE TO RELATED APPLICATION

This application claims the priority benefit of Korean Patent Application No. 10-2016-0160288, filed on Nov. 29, 2016 in the Korean Intellectual Property Office, the content of which is incorporated by reference herein in its entirety.

TECHNICAL FIELD

The present application generally relates to a vehicle that can operate in an autonomous driving mode.

BACKGROUND

A vehicle is an apparatus that moves in a direction desired by a user riding therein. A representative example of a vehicle may be an automobile.

In some implementations, a variety of sensors and electronic devices have been mounted in vehicles for the convenience of a user who uses the vehicle. In particular, for user driving convenience, an Advanced Driver Assistance System (ADAS) has been actively studied. In addition, enormous efforts have been being made to develop autonomous vehicles.

An autonomous vehicle can move toward a point desired by a user, and can stop at that point.

However, for the autonomous stopping ability, the autonomous vehicle needs an ability to determine an area for the vehicle to stop and furthermore a location or space advantageous to the user in the available stopping area.

Accordingly, there are ongoing efforts to research and develop a technology of determining an available stopping area and a stopping location advantageous to a user in a case where the autonomous vehicle enters nearby a destination or where a user request a stop.

SUMMARY

In general, one innovative aspect of the subject matter described in this specification can be implemented in a vehicle comprising: a display unit; and a controller that is configured to: obtain vehicle driving information, in a state in which (i) the vehicle moves within a first distance from a destination or (ii) the vehicle receives a stop request while the vehicle is travelling, search for at least one available stopping area based on the vehicle driving information, and display information about the at least one available stopping area on the display unit or transmit the information to a terminal.

The foregoing and other implementations can each optionally include one or more of the following features, alone or in combination. In particular, one implementation includes all the following features in combination.

The subject matter described in this specification can be implemented in particular examples so as to realize one or more of the following advantages. Comparing to a conventional vehicle, a vehicle determines an available stopping area at an autonomous driving mode. In addition, the vehicle determines a recommended area based on various criteria so that the vehicle provides convenience to a user of the vehicle. Moreover, the vehicle provides various information to a user through efficient user interface.

The details of one or more examples of the subject matter described in this specification are set forth in the accompanying drawings and the description below. Other potential features, aspects, and advantages of the subject matter will become apparent from the description, the drawings, and the claim.

BRIEF DESCRIPTION OF THE DRAWINGS

Like reference numbers and designations in the various drawings indicate like elements.

DETAILED DESCRIPTION

A vehicle as described in this specification may include an automobile and a motorcycle.

A vehicle as described in this specification may include all of an internal combustion engine vehicle including an engine as a power source, a hybrid vehicle including both an engine and an electric motor as a power source, and an electric vehicle including an electric motor as a power source.

Figure 1:
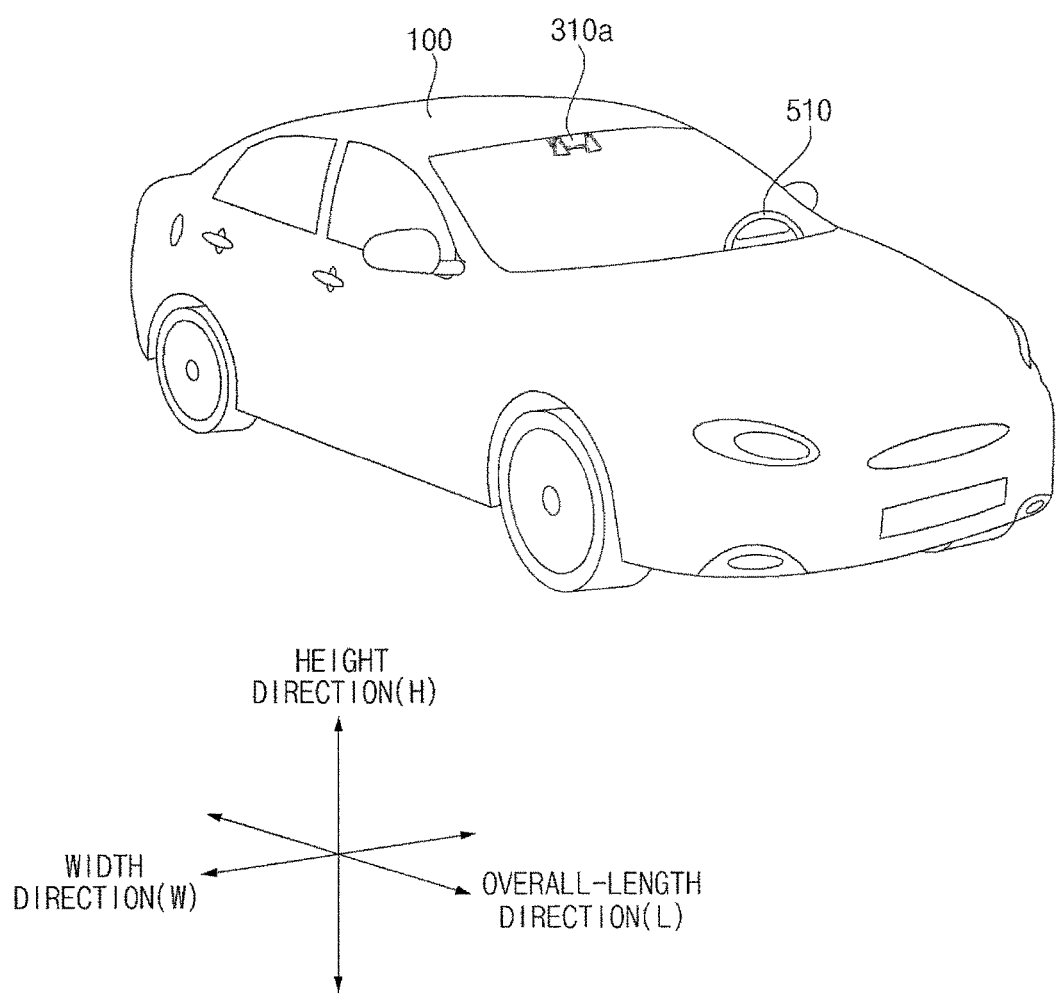
FIG. 1 is a diagram illustrating an example vehicle.
Figure 2:
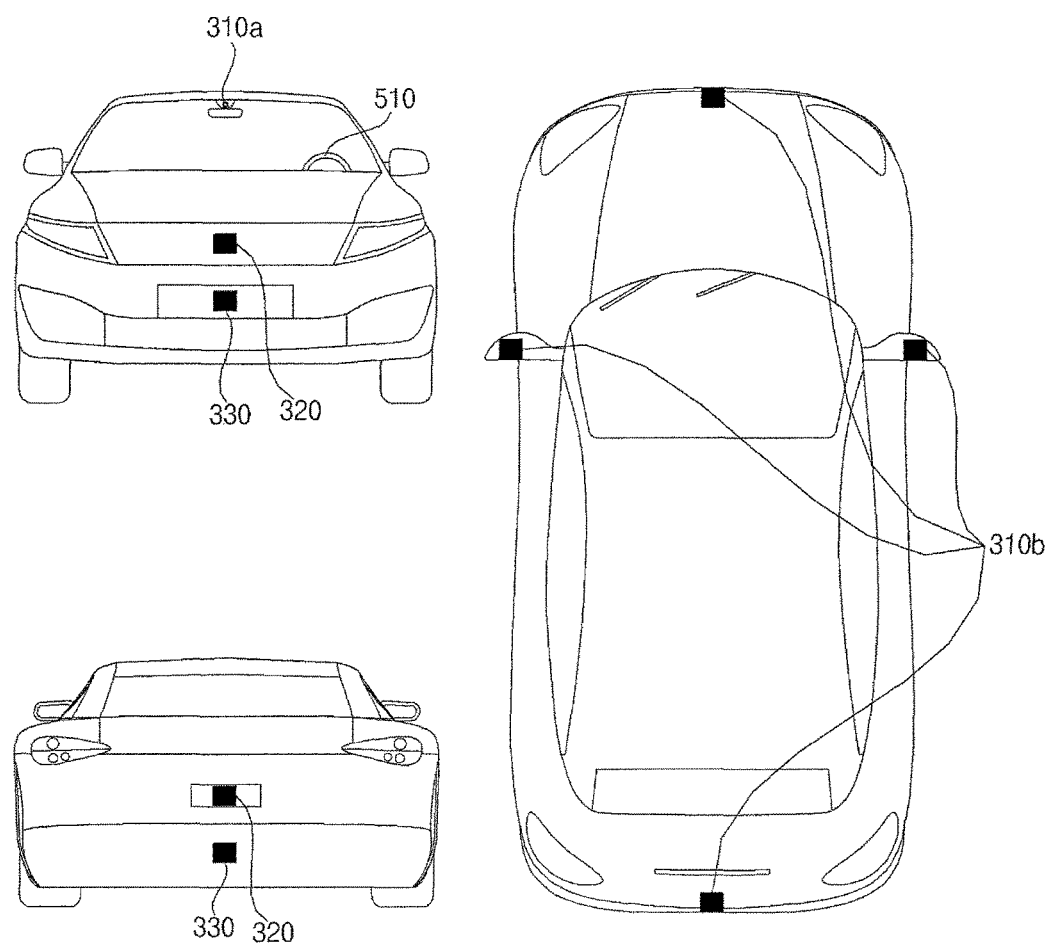
FIG. 2 is a diagram illustrating an example exterior of a vehicle.
Figure 3:
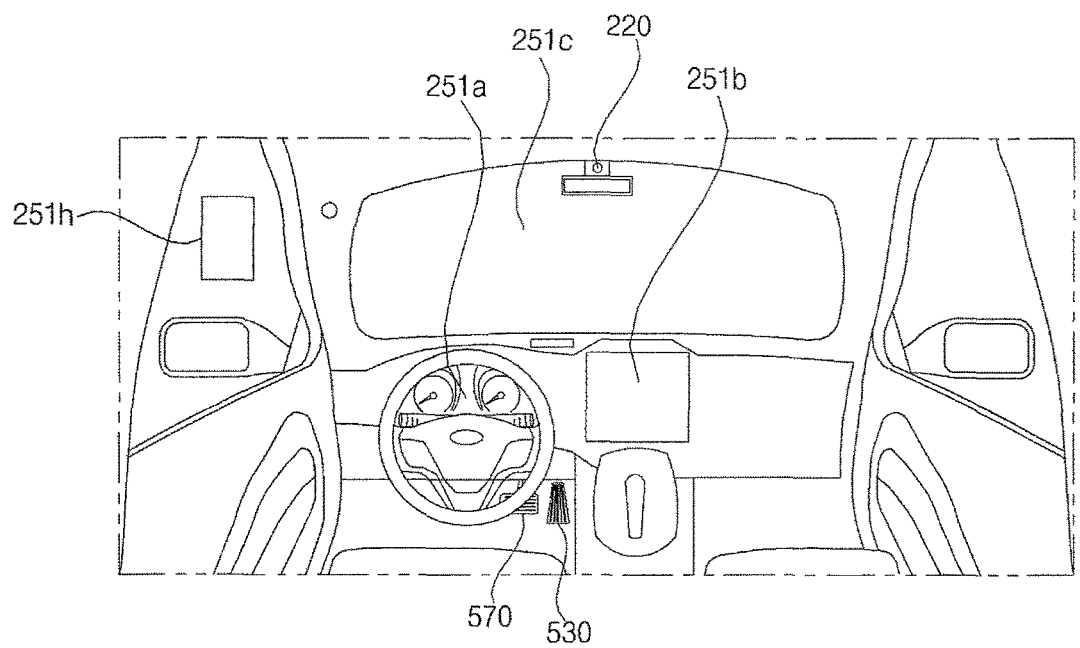
FIGS. 3 and 4 are diagrams illustrating an example interior of a vehicle.
Figure 4:
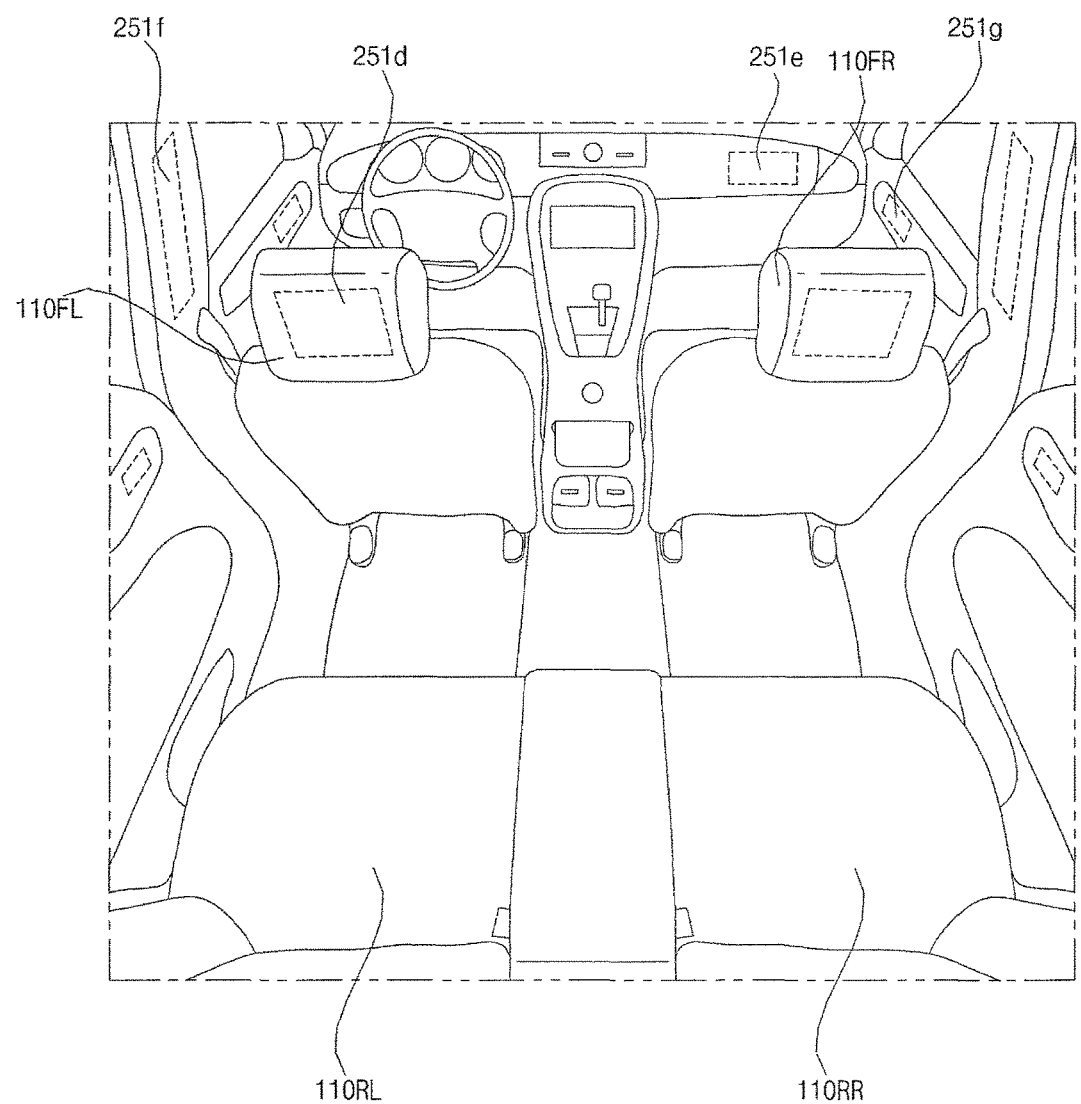
Figure 5:
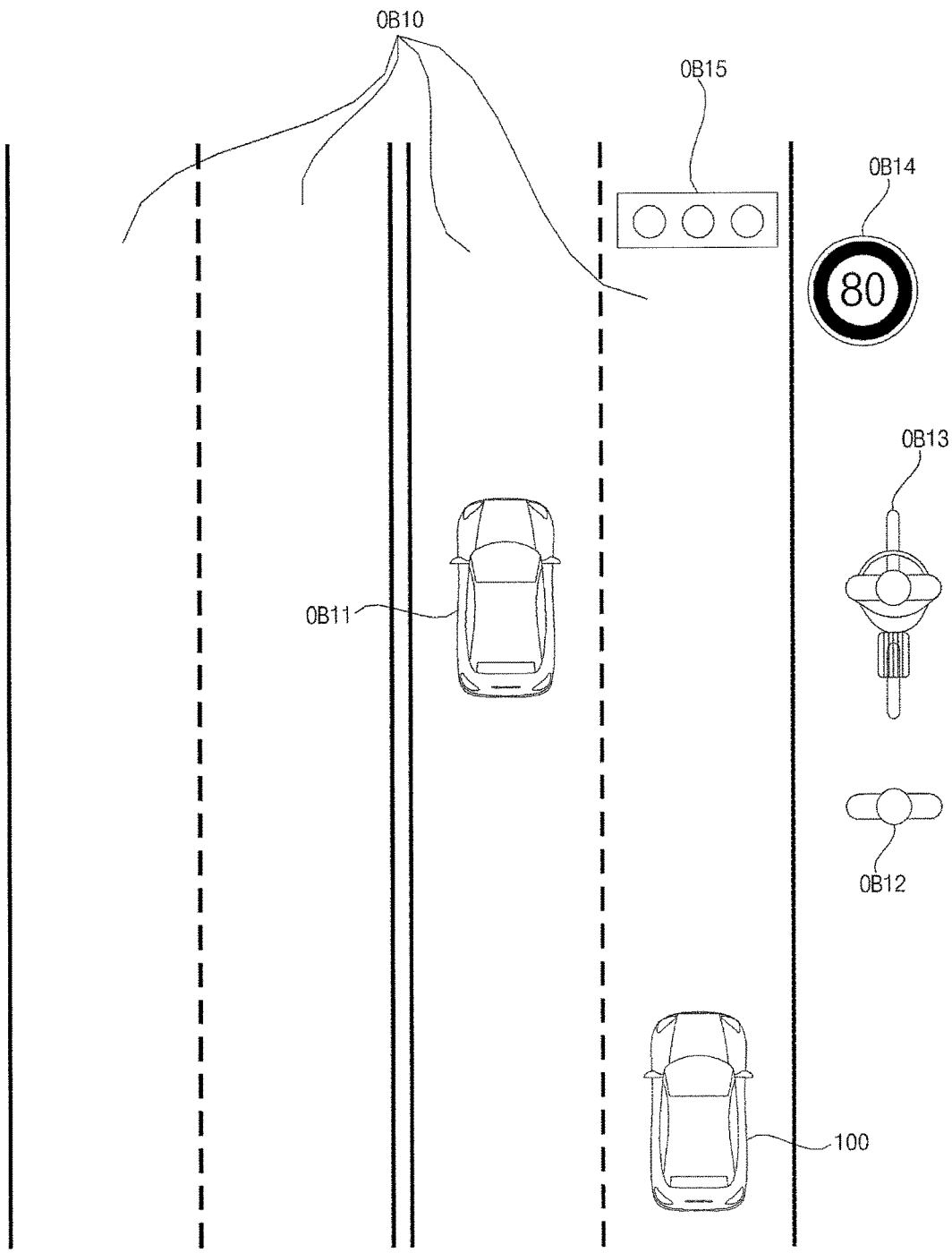
FIGS. 5 and 6 are diagrams illustrating one or more example objects outside a vehicle.
Figure 6:
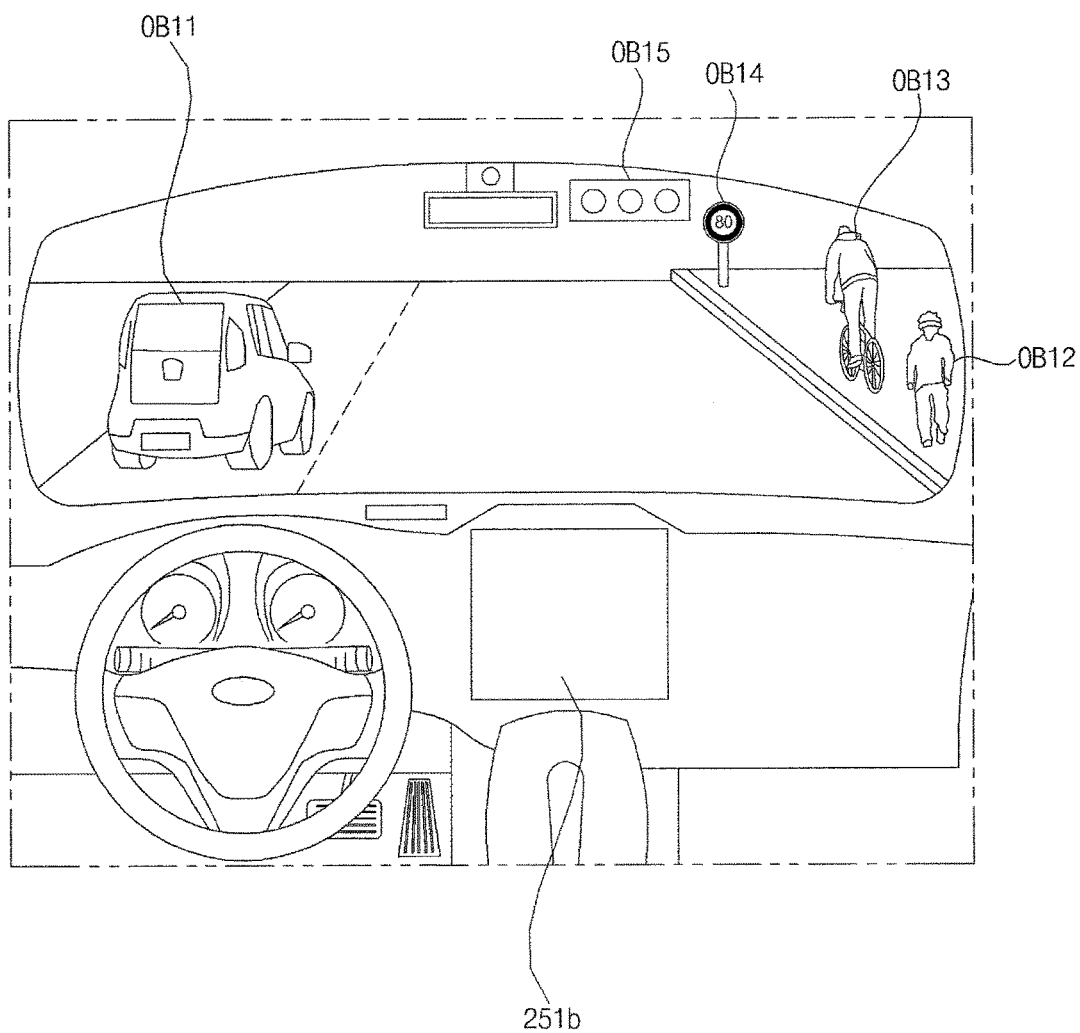
Figure 7:
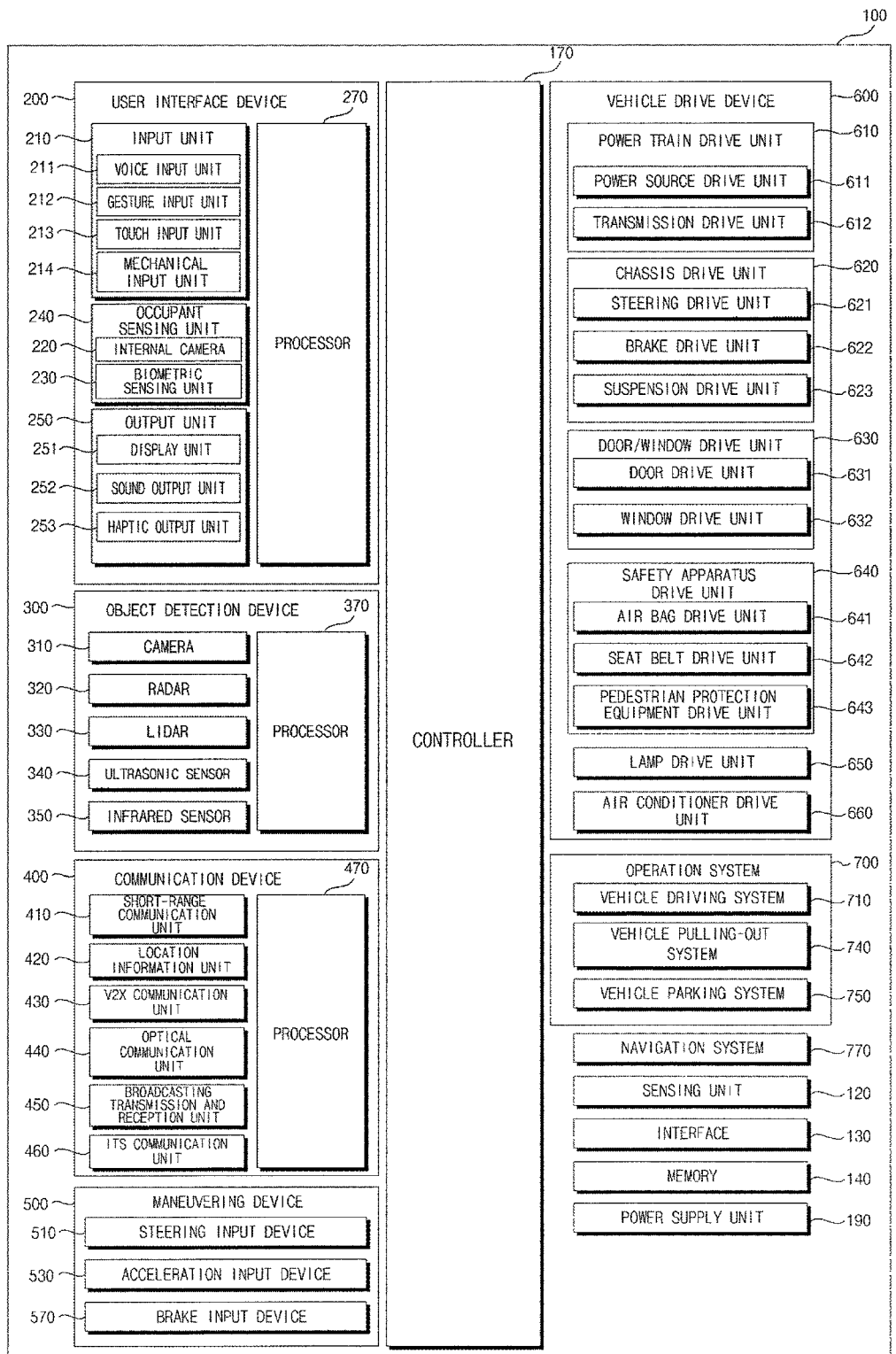
FIG. 7 is a diagram illustrating an example vehicle.

FIG. 1 illustrates an example vehicle. FIG. 2 illustrates an example exterior of a vehicle. FIGS. 3 and 4 illustrate an example interior of a vehicle. FIGS. 5 and 6 illustrate one or more example objects outside a vehicle. FIG. 7 illustrates an example vehicle.

Referring to FIGS. 1 to 7, a vehicle 100 may include a plurality of wheels, which are rotated by a power source, and a steering input device 510 for controlling a driving direction of the vehicle 100.

The vehicle 100 may be an autonomous vehicle. The vehicle 100 may travel autonomously under the control of the controller 170. The vehicle 100 may travel autonomously based on vehicle driving information.

When the vehicle 100 enters a set distance from a preset destination or receives a stop request while travelling, the vehicle 100 may search for at least one available stopping area or a recommended area based on acquired vehicle driving information, and then display information about the found available stopping area or the recommended area on the display unit 251 or transmit such information to a terminal, e.g., a preset terminal. Detailed description thereof will be provided later with reference with FIG. 8 and following drawings.

The vehicle driving information may be information that is acquired using various units, provided in the vehicle 100, during travelling of the vehicle 100. The vehicle driving information may be information that is utilized by the controller 170 or the operation system 700 to control the vehicle 100.

For example, the vehicle driving information may include at least one of the following: object information acquired by the object detection device 300, information received by the communication device 400, and a user input received by the user interface device 200 or the driving manipulation device 500.

For example, object information may be information about a shape, a location, size, and color of an object detected by the object detection device 300. For example, object information may be information about a traffic line, an obstacle, a nearby vehicle, a pedestrian, a traffic light, a road structure, contents of a traffic sign plate, and the like.

For example, information received by the communication device 400 may be information transmitted by a device that is capable of performing communication. For example, information received by the communication device 400 may be information transmitted by a nearby vehicle, information transmitted by a mobile terminal, information transmitted by traffic infrastructure, and information existing in a specific network. The traffic infrastructure may include a traffic light, and the traffic light may transmit information about a traffic signal.

For example, vehicle driving information may include at least one of the following: navigation information, information on a control state of the vehicle 100, and location information of the vehicle 100. For example, the vehicle driving information may include: information on a nearby vehicle, which is transmitted by the nearby vehicle itself: information on a travel path of the vehicle 100: and map information.

For example, the vehicle driving information may indicate: a type, location, and movement of an object existing around the vehicle 100; whether a traffic line exists in the vicinity of the vehicle 100; whether any nearby vehicle is travelling while the vehicle 100 is stopped; whether there is a space for the vehicle to stop in the vicinity; a probability of collision between the vehicle 100 and an object; where a pedestrian or a bicycle is located with reference to the vehicle 100; type of a road on which the vehicle 100 is travelling, a status of a traffic light in the vicinity of the vehicle 100, and movement of the vehicle 100.

The vehicle driving information may be acquired using at least one of the user interface device 200, the object detection device 300, the communication device 400, the driving manipulation device 500, the navigation system 770, the sensing unit 120, the interface 130, and the memory 140, and then provided to the controller 170. Based on the vehicle driving information, the controller 170 may control the vehicle 100 to travel autonomously.

A control mode of the vehicle 100 may be a mode indicating of which subject controls the vehicle 100. For example, the control mode of the vehicle 100 may include: an autonomous vehicle in which the control unit 170 or the operation system 700 included in the vehicle 100 controls the vehicle 100; a manual mode in which a driver in the vehicle 100 controls the vehicle 100; and a remote control mode in which a different device other than the vehicle 100 controls the vehicle 100.

When the vehicle 100 is in the autonomous mode, the controller 170 or the operation system 700 may control the vehicle 100 based on vehicle driving information. Accordingly, the vehicle 100 may travel without a user command received using the driving manipulation device 500. For example, the vehicle 100 in the autonomous mode may travel based on information, data, or a signal that is generated in a driving system 710, a parking-out system 740, and a parking system 750.

When the vehicle 100 in the manual mode, the vehicle 100 may be controlled by a user command received using the driving manipulation device 500, the user command which is with regard to at least one of steering, acceleration, and deceleration. In this case, the driving manipulation device 500 may generate an input signal corresponding to the user command, and provide the generated input signal to the controller 170. The controller 170 may control the vehicle based on the input signal provided by the driving manipulation device 500.

When the vehicle 100 in the remote control mode, a different device other than the vehicle 100 may control the vehicle 100. If the vehicle 100 operates in the remote control mode, the vehicle 100 may receive a remote control signal, transmitted by a nearby vehicle, through the communication device 400. The vehicle 100 may be controlled based on the remote control signal.

Based on a user input received using the user interface device 200, the vehicle 100 may enter one of the autonomous mode, the manual mode, and the remote control mode. A control mode of the vehicle 100 may be switched to one of the autonomous mode, the manual mode, and the remote control mode based on at least one of driver state information, vehicle driving information, and vehicle state information.

For example, the control mode of the vehicle 100 may be switched from a manual mode to an autonomous mode, or vice versa, based on object information generated by the object detection device 300. For example, the control mode of the vehicle 100 may be switched from a manual mode to an autonomous mode, or vice versa, based on information received using the communication device 400.

The occupant information may include an image or biometric information of a driver, which is sensed using the internal camera 220 or the biometric sensing unit 230. For example, occupant information may be an image about an occupant's location, shape, gaze, face, behavior, and facial expression, the image which is acquired using the internal camera 220. For example, biometric information may be information about an occupant's temperature, heart rate, and brainwaves, the image which is acquired using the biometric sensing unit 230. For example, occupant information may indicate a location of an occupant, gaze direction thereof, a health condition thereof, and an emotional state thereof, and whether the occupant is dozing off or not. Occupant information may be acquired using an occupant detection unit 240 and then provided to the controller 170.

The vehicle state information may be information about the states of various units provided in the vehicle 100. For example, the vehicle state information may include information about the operational states of the user interface device 200, the object detection device 300, the communication device 400, the driving manipulation device 500, the vehicle drive device 600, and the operation system 700, and information about an error of each unit. For example, the vehicle state information may indicate: whether a GPS signal of the vehicle 100 is received normally; whether an error has occurred in at least one sensor provided in the vehicle 100, and whether each device provided in the vehicle 100 operates normally.

For example, the term "overall length" means the length from the front end to the rear end of the vehicle 100, the term "overall width" means the width of the vehicle 100, and the term "overall height" means the height from the bottom of the wheel to the roof. In the following description, the term "overall length direction L" may mean the reference direction for the measurement of the overall length of the vehicle 100, the term "overall width direction W" may mean the reference direction for the measurement of the overall width of the vehicle 100, and the term "overall height direction H" may mean the reference direction for the measurement of the overall height of the vehicle 100.

As illustrated in FIG. 7, the vehicle 100 may include the user interface device 200, the object detection device 300, the communication device 400, the driving manipulation device 500, a vehicle drive device 600, the operation system 700, a navigation system 770, a sensing unit 120, an interface 130, a memory 140, a controller 170, and a power supply unit 190. In some implementations, the vehicle 100 may further include other components in addition to the aforementioned components, or may not include some of the aforementioned components.

The user interface device 200 is provided to support communication between the vehicle 100 and a user. The user interface device 200 may receive a user input, and provide information generated in the vehicle 100 to the user. The vehicle 100 may enable User Interfaces (UI) or User Experience (UX) through the user interface device 200.

The user interface device 200 may include an input unit 210, an internal camera 220, a biometric sensing unit 230, an output unit 250, and a processor 270.

In some implementations, the user interface device 200 may further include other components in addition to the aforementioned components, or may not include some of the aforementioned components.

The input unit 210 is configured to receive a user command from a user, and data collected in the input unit 210 may be analyzed by the processor 270 and then recognized as a control command of the user.

The input unit 210 may be disposed inside the vehicle 100. For example, the input unit 210 may be disposed in a region of a steering wheel, a region of an instrument panel, a region of a seat, a region of each pillar, a region of a door, a region of a center console, a region of a head lining, a region of a sun visor, a region of a windshield, or a region of a window.

The input unit 210 may include a voice input unit 211, a gesture input unit 212, a touch input unit 213, and a mechanical input unit 214.

The voice input unit 211 may convert a voice input of a user into an electrical signal. The converted electrical signal may be provided to the processor 270 or the controller 170.

The voice input unit 211 may include one or more microphones.

The gesture input unit 212 may convert a gesture input of a user into an electrical signal. The converted electrical signal may be provided to the processor 270 or the controller 170.

The gesture input unit 212 may include at least one selected from among an infrared sensor and an image sensor for sensing a gesture input of a user.

In some implementations, the gesture input unit 212 may sense a three-dimensional (3D) gesture input of a user. To this end, the gesture input unit 212 may include a plurality of light emitting units for outputting infrared light, or a plurality of image sensors.

The gesture input unit 212 may sense the 3D gesture input by employing a Time of Flight (TOF) scheme, a structured light scheme, or a disparity scheme.

The touch input unit 213 may convert a user's touch input into an electrical signal. The converted electrical signal may be provided to the processor 270 or the controller 170.

The touch input unit 213 may include a touch sensor for sensing a touch input of a user.

In some implementations, the touch input unit 210 may be formed integral with a display unit 251 to implement a touch screen. The touch screen may provide an input interface and an output interface between the vehicle 100 and the user.

The mechanical input unit 214 may include at least one selected from among a button, a dome switch, a jog wheel, and a jog switch. An electrical signal generated by the mechanical input unit 214 may be provided to the processor 270 or the controller 170.

The mechanical input unit 214 may be located on a steering wheel, a center fascia, a center console, a cockpit module, a door, etc.

The occupant detection unit 240 may detect an occupant inside the vehicle 100. The occupant detection unit 240 may include the internal camera 220 and the biometric sensing unit 230.

The internal camera 220 may acquire images of the inside of the vehicle 100. The processor 270 may sense a user's state based on the images of the inside of the vehicle 100. For example, a user's sensed state may be related to a user's gaze, face, behavior, facial expression, and location.

The processor 270 may acquire information about the user's gaze, face, behavior, facial expression, and location. The processor 270 may acquire information about a user's gesture from an image of the inside of the vehicle. The information acquired by the processor 270 from the image of the inside of the vehicle may be occupant information. In this case, the occupant information may show a driver's gaze direction, behavior, facial expression, and gesture. The processor 270 may provide the occupant information, acquired from the image of the inside of the vehicle, to the controller 170.

The biometric sensing unit 230 may acquire biometric information of the user. The biometric sensing unit 230 may include a sensor for acquire biometric information of the user, and may utilize the sensor to acquire finger print information, heart rate information, and brainwaves information of the user. The biometric information may be used to authenticate a user and determine a user's state.

The processor 270 may determine a driver's state based on the driver's biometric information. Information acquired by the processor 270 through determining the driver's state may be occupant information. In this case, the occupant information may indicate whether the driver is in faint, dozing off, excited, or in an emergency situation. The processor 270 may provide the controller 170 with the occupant information which is acquired based on the driver's biometric information.

The output unit 250 is configured to generate a visual, audio, or tactile output.

The output unit 250 may include at least one selected from among a display unit 251, a sound output unit 252, and a haptic output unit 253.

The display unit 251 may display graphic objects corresponding to various types of information.

The display unit 251 may include at least one selected from among a Liquid Crystal Display (LCD), a Thin Film Transistor-Liquid Crystal Display (TFT LCD), an Organic Light-Emitting Diode (OLED), a flexible display, a 3D display, and an e-ink display.

The display unit 251 may form an inter-layer structure together with the touch input unit 213, or may be integrally formed with the touch input unit 213 to implement a touch screen.

The display unit 251 may be implemented as a Head Up Display (HUD). When implemented as a HUD, the display unit 251 may include a projector module in order to output information through an image projected on a windshield or a window.

The display unit 251 may include a transparent display. The transparent display may be attached on the windshield or the window.

The transparent display may display a predetermined screen with a predetermined transparency. In order to achieve the transparency, the transparent display may include at least one selected from among a transparent Thin Film Electroluminescent (TFEL) display, an Organic Light Emitting Diode (OLED) display, a transparent Liquid Crystal Display (LCD), a transmissive transparent display, and a transparent Light Emitting Diode (LED) display. The transparency of the transparent display may be adjustable.

In some implementations, the user interface device 200 may include a plurality of display units 251a to 251g.

The display unit 251 may be disposed in a region of a steering wheel, a region 251a, 251b, or 251e of an instrument panel, a region 251d of a seat, a region 251f of each pillar, a region 251g of a door, a region of a center console, a region of a head lining, a region of a sun visor, a region 251c of a windshield, or a region 251h of a window.

The sound output unit 252 converts an electrical signal from the processor 270 or the controller 170 into an audio signal, and outputs the audio signal. To this end, the sound output unit 252 may include one or more speakers.

The haptic output unit 253 generates a tactile output. For example, the haptic output unit 253 may operate to vibrate a steering wheel, a safety belt, and seats 110FL, 110FR, 110RL, and 110RR so as to allow a user to recognize the output.

The processor 270 may control the overall operation of each unit of the user interface device 200.

In some implementations, the user interface device 200 may include a plurality of processors 270 or may not include the processor 270.

In a case where the user interface device 200 does not include the processor 270, the user interface device 200 may operate under control of the controller 170 or a processor of a different device inside the vehicle 100.

In some implementations, the user interface device 200 may be referred to as a display device for vehicle.

The user interface device 200 may operate under control of the controller 170.

The object detection device 300 is configured to detect an object outside the vehicle 100.

The object may include various objects related to travelling of the vehicle 100.

Referring to FIGS. 5 and 6, an object o may include a lane OB10, a line for distinguishing the lane OB10, a nearby vehicle OB11, a pedestrian OB12, a two-wheeled vehicle OB13, a traffic signal OB14 and OB15, a curb for distinguishing a sidewalk, a light, a road, a structure, a bump, a geographical feature, an animal, etc.

The lane OB10 may be a lane in which the vehicle 100 is traveling, a lane next to the lane in which the vehicle 100 is traveling, and a lane in which a different vehicle coming in the opposite direction. The lane OB10 may include left and right lines that define the lane.

The nearby vehicle OB11 may be a vehicle that is travelling in the vicinity of the vehicle 100. The nearby vehicle OB11 may be a vehicle within a predetermined distance from the vehicle 100. For example, the nearby vehicle OB11 may be a vehicle that is preceding or following the vehicle 100.

The pedestrian OB12 may be a person in the vicinity of the vehicle 100. The pedestrian OB12 may be a person within a predetermined distance from the vehicle 100. For example, the pedestrian OB12 may be a person on a sidewalk or on the roadway.

The two-wheeled vehicle OB13 is a vehicle that is located in the vicinity of the vehicle 100 and moves with two wheels. The two-wheeled vehicle OB13 may be a vehicle that has two wheels within a predetermined distance from the vehicle 100. For example, the two-wheeled vehicle OB13 may be a motorcycle or a bike on a sidewalk or the roadway.

The traffic signal OB14 and OB15 may include a traffic light OB15, a traffic sign plate OB14, and a pattern or text painted on a road surface.

The light may be light generated by a lamp provided in the nearby vehicle. The light may be light generated by a street light. The light may be solar light.

The road may include a road surface, a curve, and slopes, such as an upward slope and a downward slope.

The structure may be a body located around the road in the state of being fixed onto the ground. For example, the structure may include a streetlight, a roadside tree, a building, a traffic light, a bridge, a curb, a guardrail, etc.

In some implementations, the object may be classified as a movable object or a stationary object. For example, the movable object may include a nearby vehicle and a pedestrian. For example, the stationary object may include a traffic signal, a road, a structure, and a traffic line.

The object detection device 300 may include a camera 310, a radar 320, a lidar 330, an ultrasonic sensor 340, an infrared sensor 350, and a processor 370.

In some implementations, the object detection device 300 may further include other components in addition to the aforementioned components, or may not include some of the aforementioned components.

The camera 310 may be located at an appropriate position outside the vehicle 100 in order to acquire images of the outside of the vehicle 100. The camera 310 may provide an acquired image to the processor 270. The camera 310 may be a mono camera, a stereo camera 310a, an Around View Monitoring (AVM) camera 310b, or a 360-degree camera.

For example, the camera 310 may be disposed near a front windshield in the vehicle 100 in order to acquire images of the front of the vehicle 100. Alternatively, the camera 310 may be disposed around a front bumper or a radiator grill.

In another example, the camera 310 may be disposed near a rear glass in the vehicle 100 in order to acquire images of the rear of the vehicle 100. Alternatively, the camera 310 may be disposed around a rear bumper, a trunk, or a tailgate.

In yet another example, the camera 310 may be disposed near at least one of the side windows in the vehicle 100 in order to acquire images of the side of the vehicle 100. Alternatively, the camera 310 may be disposed around a side mirror, a fender, or a door.

The radar 320 may include an electromagnetic wave transmission unit and an electromagnetic wave reception unit. The radar 320 may be realized as a pulse radar or a continuous wave radar depending on the principle of emission of an electronic wave. In addition, the radar 320 may be realized as a Frequency Modulated Continuous Wave (FMCW) type radar or a Frequency Shift Keying (FSK) type radar depending on the waveform of a signal.

The radar 320 may detect an object through the medium of an electromagnetic wave by employing a time of flight (TOF) scheme or a phase-shift scheme, and may detect a location of the detected object, the distance to the detected object, and the speed relative to the detected object.

The radar 320 may be located at an appropriate position outside the vehicle 100 in order to sense an object located in front of the vehicle 100, an object located to the rear of the vehicle 100, or an object located to the side of the vehicle 100.

The lidar 330 may include a laser transmission unit and a laser reception unit. The lidar 330 may be implemented by the TOF scheme or the phase-shift scheme. The lidar 330 may be implemented as a drive type lidar or a non-drive type lidar.

When implemented as the drive type lidar, the lidar 300 may rotate by a motor and detect an object in the vicinity of the vehicle 100.

When implemented as the non-drive type lidar, the lidar 300 may utilize a light steering technique to detect an object located within a predetermined distance from the vehicle 100.

The lidar 330 may detect an object through the medium of laser light by employing the TOF scheme or the phase-shift scheme, and may detect a location of the detected object, the distance to the detected object, and the speed relative to the detected object.

The lidar 330 may be located at an appropriate position outside the vehicle 100 in order to sense an object located in front of the vehicle 100, an object located to the rear of the vehicle 100, or an object located to the side of the vehicle 100.

The ultrasonic sensor 340 may include an ultrasonic wave transmission unit and an ultrasonic wave reception unit. The ultrasonic sensor 340 may detect an object based on an ultrasonic wave, and may detect a location of the detected object, the distance to the detected object, and the speed relative to the detected object.

The ultrasonic sensor 340 may be located at an appropriate position outside the vehicle 100 in order to detect an object located in front of the vehicle 100, an object located to the rear of the vehicle 100, and an object located to the side of the vehicle 100.

The infrared sensor 350 may include an infrared light transmission unit and an infrared light reception unit. The infrared sensor 340 may detect an object based on infrared light, and may detect a location of the detected object, the distance to the detected object, and the speed relative to the detected object.

The infrared sensor 350 may be located at an appropriate position outside the vehicle 100 in order to sense an object located in front of the vehicle 100, an object located to the rear of the vehicle 100, or an object located to the side of the vehicle 100.

The processor 370 may control the overall operation of each unit included in the object detection device 300.

The processor 370 may detect and track an object based on acquired images. The processor 370 may, for example, perform operations that include calculating the distance to the object and the speed relative to the object, determining the object's type, location, size, shape, and a moving path, and determining contents of a sensed text.

The processor 370 may detect and track an object based on a reflection electromagnetic wave which is formed as a result of reflection a transmission electromagnetic wave by the object. Based on the electromagnetic wave, the processor 370 may, for example, calculate the distance to the object and the speed relative to the object.

The processor 370 may detect and track an object based on a reflection laser light which is formed as a result of reflection of transmission laser by the object. Based on the laser light, the processor 370 may, for example, calculate the distance to the object and the speed relative to the object.

The processor 370 may detect and track an object based on a reflection ultrasonic wave which is formed as a result of reflection of a transmission ultrasonic wave by the object. Based on the ultrasonic wave, the processor 370 may, for example, calculate the distance to the object and the speed relative to the object.

The processor 370 may detect and track an object based on reflection infrared light which is formed as a result of reflection of transmission infrared light by the object. Based on the infrared light, the processor 370 may, for example, calculate the distance to the object and the speed relative to the object.

The processor may generate object information based on at least one of the following: an information acquired through the camera 310, a reflected electronic wave received using the radar 320, a reflected laser light received using the lidar 330, and a reflected ultrasonic wave received using the ultrasonic sensor 340, and a reflected infrared light received using the infrared sensor 350.

The object information may be information about type, location, size, shape, color, a moving path, and speed of an object existing in the vicinity of the vehicle 100 and information about a sensed text.

For example, the object information may indicate: whether a traffic line exists in the vicinity of the vehicle 100; whether any nearby vehicle is travelling while the vehicle 100 is stopped; whether there is a space for the vehicle 100 to stop in the vicinity; a probability of collision between the vehicle 100 and an object; where a pedestrian or a bicycle is located with reference to the vehicle 100; type of a road on which the vehicle 100 is travelling, a status of a traffic light in the vicinity of the vehicle 100, and movement of the vehicle 100. The object information may be included in the vehicle driving information.

The processor 370 may provide the generated object to the controller 170.

In some implementations, the object detection device 300 may include a plurality of processors 370 or may not include the processor 370. For example, each of the camera 310, the radar 320, the lidar 330, the ultrasonic sensor 340, and the infrared sensor 350 may include its own processor.

The object detection device 300 may operate under control of the controller 170 or a processor inside the vehicle 100.

The communication device 400 is configured to perform communication with an external device. Here, the external device may be a nearby vehicle, a mobile terminal, or a server.

To perform communication, the communication device 400 may include at least one selected from among a transmission antenna, a reception antenna, a Radio Frequency (RF) circuit capable of implementing various communication protocols, and an RF device.

The communication device 400 may include a short-range communication unit 410, a location information unit 420, a V2X communication unit 430, an optical communication unit 440, a broadcast transmission and reception unit 450, and a processor 470.

In some implementations, the communication device 400 may further include other components in addition to the aforementioned components, or may not include some of the aforementioned components.

The short-range communication unit 410 is configured to perform short-range communication. The short-range communication unit 410 may support short-range communication using at least one selected from among Bluetooth™, Radio Frequency IDdentification (RFID), Infrared Data Association (IrDA), Ultra-WideBand (UWB), ZigBee, Near Field Communication (NFC), Wireless-Fidelity (Wi-Fi), Wi-Fi Direct, and Wireless USB (Wireless Universal Serial Bus).

The short-range communication unit 410 may form wireless area networks to perform short-range communication between the vehicle 100 and at least one external device.

The location information unit 420 is configured to acquire location information of the vehicle 100. For example, the location information unit 420 may include at least one of a Global Positioning System (GPS) module, a Differential Global Positioning System (DGPS) module, and a Carrier phase Differential GPS (CDGPS).

The location information unit 420 may acquire GPS information using a GPs module. The location information unit 420 may transfer the acquired GPS information to the controller 170 or the processor 470. The GPS information acquired by the location information unit 420 may be utilized for autonomous travel of the vehicle 100. For example, based on GPS information and navigation information acquired using the navigation system 770, the controller 170 may control the vehicle 100 to travel autonomously.

The V2X communication unit 430 is configured to perform wireless communication between a vehicle and a server (that is, vehicle to infra (V2I) communication), wireless communication between a vehicle and a nearby vehicle (that is, vehicle to vehicle (V2V) communication), or wireless communication between a vehicle and a pedestrian (that is, vehicle to pedestrian (V2P) communication).

The optical communication unit 440 is configured to perform communication with an external device through the medium of light. The optical communication unit 440 may include a light emitting unit, which converts an electrical signal into an optical signal and transmits the optical signal to the outside, and a light receiving unit which converts a received optical signal into an electrical signal.

In some implementations, the light emitting unit may be integrally formed with a lamp provided included in the vehicle 100.

The broadcast transmission and reception unit 450 is configured to receive a broadcast signal from an external broadcasting management server or transmit a broadcast signal to the broadcasting management server through a broadcasting channel. The broadcasting channel may include a satellite channel, and a terrestrial channel. The broadcast signal may include a TV broadcast signal, a radio broadcast signal, and a data broadcast signal.

The processor 470 may control the overall operation of each unit of the communication device 400.

Vehicle driving information may include information received using at least one of the short-range communication unit 410, the location information unit 420, the V2X communication unit 430, the optical communication unit 440, and the broadcast transmission and reception unit 450.

For example, the vehicle driving information may include information about a location, a type, a travel path, a speed, and a variety of sensing values of a nearby vehicle, the information which is received from the nearby vehicle. If information on a variety of sensing information of the nearby vehicle is received using the communication device 400, the controller 170 may acquire information on various objects existing around the vehicle 100, even though the vehicle 100 does not have an additional sensor.

For example, the vehicle driving information may indicate: type, location, and movement of an object existing in the vicinity of the vehicle 100; whether a traffic line exists in the vicinity of the vehicle 100; whether any nearby vehicle is travelling while the vehicle 100 is stopped; whether there is a space for the vehicle 100 to stop in the vicinity; a probability of collision between the vehicle 100 and an object; where a pedestrian or a bicycle is located with reference to the vehicle 100; type of a road on which the vehicle 100 is travelling, a status of a traffic light in the vicinity of the vehicle 100, and movement of the vehicle 100.

In some implementations, the communication device 400 may include a plurality of processors 470, or may not include the processor 470.

In a case where the communication device 400 does not include the processor 470, the communication device 400 may operate under control of the controller 170 or a processor of a device inside of the vehicle 100.

In some implementations, the communication device 400 may implement a vehicle display device, together with the user interface device 200. In this case, the vehicle display device may be referred to as a telematics device or an Audio Video Navigation (AVN) device.

The communication device 400 may operate under control of the controller 170.

The driving manipulation device 500 is configured to receive a user input for driving the vehicle 100.

In the manual mode, the vehicle 100 may operate based on a signal provided by the driving manipulation device 500.

The driving manipulation device 500 may include a steering input device 510, an acceleration input device 530, and a brake input device 570.

The steering input device 510 may receive a user command with regard to steering. The user command with regard to steering may be a command corresponding to a specific steering angle. For example, a user command with regard to steering may be a right 45 degree angle.

The steering input device 510 may take the form of a wheel to enable a steering input through the rotation thereof. In this case, the steering input device 510 may be called a steering wheel or a handle.

In some implementations, the steering input device may be provided as a touchscreen, a touch pad, or a button.

The acceleration input device 530 may receive a user command with regard to acceleration of the vehicle 100 from a user.

The brake input device 570 may receive a user command with regard to deceleration of the vehicle 100 from a user. The acceleration input device 530 and the brake input device 570 may take the form of a pedal.

In some implementations, the acceleration input device or the break input device may be configured as a touch screen, a touch pad, or a button.

The driving manipulation device 500 may operate under control of the controller 170.

The vehicle drive device 600 is configured to electrically control the operation of various devices of the vehicle 100.

The vehicle drive device 600 may include a power train drive unit 610, a chassis drive unit 620, a door/window drive unit 630, a safety apparatus drive unit 640, a lamp drive unit 650, and an air conditioner drive unit 660.

In some implementations, the vehicle drive device 600 may further include other components in addition to the aforementioned components, or may not include some of the aforementioned components.

In some implementations, the vehicle drive device 600 may include a processor. Each unit of the vehicle drive device 600 may include its own processor.

The power train drive unit 610 may control the operation of a power train.

The power train drive unit 610 may include a power source drive unit 611 and a transmission drive unit 612.

The power source drive unit 611 may control a power source of the vehicle 100.

In the case in which a fossil fuel-based engine is the power source, the power source drive unit 611 may perform electronic control of the engine. As such the power source drive unit 611 may control, for example, the output torque of the engine. The power source drive unit 611 may adjust the output toque of the engine under control of the controller 170.

In a case where an electric motor is the power source, the power source drive unit 611 may control the motor. The power source drive unit 610 may control, for example, the RPM and toque of the motor under control of the controller 170.

The transmission drive unit 612 may control a transmission.

The transmission drive unit 612 may adjust the state of the transmission. The transmission drive unit 612 may adjust a state of the transmission to a drive (D), reverse (R), neutral (N), or park (P) state.

In some implementations, in a case where an engine is the power source, the transmission drive unit 612 may adjust a gear-engaged state to the drive position D.

The chassis drive unit 620 may control the operation of a chassis.

The chassis drive unit 620 may include a steering drive unit 621, a brake drive unit 622, and a suspension drive unit 623.

The steering drive unit 621 may perform electronic control of a steering apparatus provided inside the vehicle 100. The steering drive unit 621 may change the direction of travel of the vehicle 100.

The brake drive unit 622 may perform electronic control of a brake apparatus provided inside the vehicle 100. For example, the brake drive unit 622 may reduce the speed of the vehicle 100 by controlling the operation of a brake located at a wheel.

In some implementations, the brake drive unit 622 may control a plurality of brakes individually. The brake drive unit 622 may apply a different degree-braking force to each wheel.

The suspension drive unit 623 may perform electronic control of a suspension apparatus inside the vehicle 100. For example, when the road surface is uneven, the suspension drive unit 623 may control the suspension apparatus so as to reduce the vibration of the vehicle 100.

In some implementations, the suspension drive unit 623 may control a plurality of suspensions individually.

The door/window drive unit 630 may perform electronic control of a door apparatus or a window apparatus inside the vehicle 100.

The door/window drive unit 630 may include a door drive unit 631 and a window drive unit 632.

The door drive unit 631 may control the door apparatus. The door drive unit 631 may control opening or closing of a plurality of doors included in the vehicle 100. The door drive unit 631 may control opening or closing of a trunk or a tail gate. The door drive unit 631 may control opening or closing of a sunroof.

The window drive unit 632 may perform electronic control of the window apparatus. The window drive unit 632 may control opening or closing of a plurality of windows included in the vehicle 100.

The safety apparatus drive unit 640 may perform electronic control of various safety apparatuses provided inside the vehicle 100.

The safety apparatus drive unit 640 may include an airbag drive unit 641, a safety belt drive unit 642, and a pedestrian protection equipment drive unit 643.

The airbag drive unit 641 may perform electronic control of an airbag apparatus inside the vehicle 100. For example, upon detection of a dangerous situation, the airbag drive unit 641 may control an airbag to be deployed.

The safety belt drive unit 642 may perform electronic control of a seatbelt apparatus inside the vehicle 100. For example, upon detection of a dangerous situation, the safety belt drive unit 642 may control passengers to be fixed onto seats 110FL, 110FR, 110RL, and 110RR with safety belts.

The pedestrian protection equipment drive unit 643 may perform electronic control of a hood lift and a pedestrian airbag. For example, upon detection of a collision with a pedestrian, the pedestrian protection equipment drive unit 643 may control a hood lift and a pedestrian airbag to be deployed.

The lamp drive unit 650 may perform electronic control of various lamp apparatuses provided inside the vehicle 100.

The air conditioner drive unit 660 may perform electronic control of an air conditioner inside the vehicle 100. For example, when the inner temperature of the vehicle 100 is high, an air conditioner drive unit 660 may operate the air conditioner so as to supply cool air to the inside of the vehicle 100.

The vehicle drive device 600 may include a processor. Each unit of the vehicle dive device 600 may include its own processor.

The vehicle drive device 600 may operate under control of the controller 170.

The operation system 700 is a system for controlling various types of driving the vehicle 100. The operation system 700 may operate in the autonomous driving mode. The operation system 700 may perform autonomous driving of the vehicle 100 based on location information and navigation information of the vehicle 100. The operation system 700 may include the driving system 710, the parking-out system 740, and the parking system 750.

In some implementations, the operation system 700 may further include other components in addition to the aforementioned components, or may not include some of the aforementioned component.

In some implementations, the operation system 700 may include a processor. Each unit of the operation system 700 may include its own processor.

In some implementations, in some implementations, in a case where the operation system 700 is implemented as software, the operation system 700 may be a subordinate concept of the controller 170.

In some implementations, in some implementations, the operation system 700 may be a concept including at least one selected from among the user interface device 200, the object detection device 300, the communication device 400, the vehicle drive device 600, and the controller 170.

The driving system 710 may perform a driving operation of the vehicle 100.

The driving system 710 may perform a driving operation of the vehicle 100 by providing a control signal to the vehicle drive device 600 based on location information of the vehicle 100 and navigation information provided from the navigation system 770.

The driving system 710 may perform a driving operation of the vehicle 100 by providing a control signal to the vehicle drive device 600 based on object information provided from the object detection device 300.

The driving system 710 may perform a driving operation of the vehicle 100 by providing a control signal to the vehicle drive device 600 based on a signal provided from an external device through the communication device 400.

The parking-out system 740 may perform a parking-out operation of the vehicle 100.

The paring-out system 740 may perform a parking-out operation of the vehicle 100 by providing a control signal to the vehicle drive device 600 based on location information of the vehicle 100 and navigation information provided from the navigation system 770.

The parking-out system 740 may perform a parking-out operation of the vehicle 100 by providing a control signal to the vehicle drive device 600 based on object information provided from the object detection device 300.

The parking-out system 740 may perform a parking-out operation of the vehicle 100 by providing a control signal to the vehicle drive device 600 based on a signal provided from an external device through the communication device 400.

The parking system 750 may perform a parking operation of the vehicle 100.

The parking system 750 may perform a parking operation of the vehicle 100 by providing a control signal to the vehicle drive device 600 based on location information of the vehicle 100 and navigation information provided from the navigation system 770.

The vehicle parking system 750 may perform a parking operation of the vehicle 100 by providing a control signal to the vehicle drive device 600 based on object information provided from the object detection device 300.

The parking system 750 may perform a parking operation of the vehicle 100 by providing a control signal to the vehicle drive device 600 based on a signal provided from an external device through the communication device 400.

The navigation system 770 may provide navigation information. The navigation information may include at least one selected from among map information, information on a set destination, information on a route to the set destination, information on various objects along the route, lane information, and information on a current location of the vehicle.

The navigation system 770 may include a memory and a processor. The memory may store navigation information. The processor may control the operation of the navigation system 770.

In some implementations, the navigation system 770 may update pre-stored information by receiving information from an external device through the communication device 400.

In some implementations, the navigation system 770 may be classified as an element of the user interface device 200.

The sensing unit 120 may sense the state of the vehicle. The sensing unit 120 may include an attitude sensor (for example, a yaw sensor, a roll sensor, or a pitch sensor), a collision sensor, a wheel sensor, a speed sensor, a gradient sensor, a weight sensor, a heading sensor, a yaw sensor, a gyro sensor, a position module, a vehicle forward/reverse movement sensor, a battery sensor, a fuel sensor, a tire sensor, a steering sensor based on the rotation of the steering wheel, an in-vehicle temperature sensor, an in-vehicle humidity sensor, an ultrasonic sensor, an illumination sensor, an accelerator pedal position sensor, and a brake pedal position sensor.

The sensing unit 120 may acquire sensing signals with regard to, for example, vehicle attitude information, vehicle collision information, vehicle driving direction information, vehicle location information (GPS information), vehicle angle information, vehicle speed information, vehicle acceleration information, vehicle tilt information, vehicle forward/reverse movement information, battery information, fuel information, tire information, vehicle lamp information, in-vehicle temperature information, in-vehicle humidity information, steering-wheel rotation angle information, out-of-vehicle illumination information, information about the pressure applied to an accelerator pedal, and information about the pressure applied to a brake pedal. Information acquired by the sensing unit 120 may be included in vehicle driving information.

The sensing unit 120 may further include, for example, an accelerator pedal sensor, a pressure sensor, an engine speed sensor, an Air Flow-rate Sensor (AFS), an Air Temperature Sensor (ATS), a Water Temperature Sensor (WTS), a Throttle Position Sensor (TPS), a Top Dead Center (TDC) sensor, and a Crank Angle Sensor (CAS).

The interface 130 may serve as a passage for various kinds of external devices that are connected to the vehicle 100. For example, the interface 130 may have a port that is connectable to a mobile terminal and may be connected to the mobile terminal through the port. In this case, the interface 130 may exchange data with the mobile terminal.

In some implementations, the interface 130 may serve as a passage for the supply of electrical energy to a mobile terminal connected thereto. When the mobile terminal is electrically connected to the interface 130, the interface 130 may provide electrical energy, supplied from the power supply unit 190, to the mobile terminal under control of the controller 170.

The memory 140 is electrically connected to the controller 170. The memory 140 may store basic data for each unit, control data for the operational control of each unit, and input/output data. The memory 140 may be any of various hardware storage devices, such as a ROM, a RAM, an EPROM, a flash drive, and a hard drive. The memory 140 may store various data for the overall operation of the vehicle 100, such as programs for the processing or control of the controller 170.

In some implementations, the memory 140 may be integrally formed with the controller 170, or may be provided as an element of the controller 170.

The power supply unit 190 may supply power required to operate each component under control of the controller 170. In particular, the power supply unit 190 may receive power from, for example, a battery inside the vehicle 100.

The controller 170 may control the overall operation of each unit inside the vehicle 100. The controller 170 may be referred to as an Electronic Controller (ECU).

When the vehicle 100 is in an autonomous mode, the controller 170 may perform autonomous driving of the vehicle 100 based on information acquired using a device provided in the vehicle 100. For example, the controller 170 may control the vehicle 100 based on navigation information provided from the navigation system 770 or information provided from the object detection device 300 or the communication device 400. When the vehicle 100 is in a manual mode, the controller 170 may control the vehicle 100 based on an input signal corresponding to a user command that is received by the driving manipulation device 500. When the vehicle 100 is in a remote control mode, the controller 170 may control the vehicle 100 based on a remote control signal received by the communication device 400.

At least one processor and the controller 170 included in the vehicle 100 may be implemented using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for the implementation of other functions.

Hereinafter, operations of the vehicle 100 and the controller 170 according to the present invention will be described in detail with reference to FIGS. 8 to 29.

When the vehicle 100 enters a set distance from a preset destination or receives a stop request while travelling, the controller 170 may search for at least one available stopping area based on acquired vehicle driving information, and then display information about the found available stopping area on the display unit 251 or transmit such information to a preset terminal.

Figure 8:
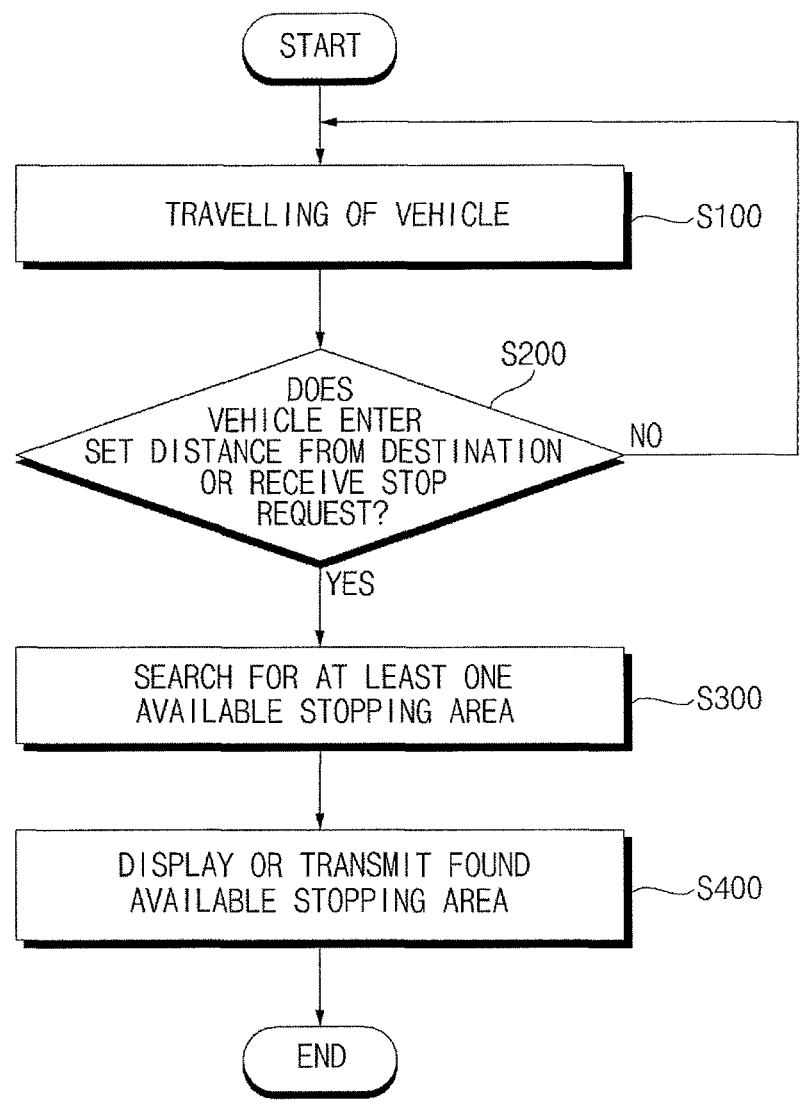
FIG. 8 is a flowchart illustrating an example method for controlling a vehicle.

FIG. 8 illustrates an example method for controlling a vehicle.

While the vehicle 100 travels in S100, the controller 170 may determine whether the vehicle 100 enters a set distance from a preset destination or receives a stop request in S200.

While the vehicle 100 travels, the controller 170 may acquire vehicle driving information using at least one of the user interface device 200, the object detection device 300, the communication device 400, the driving manipulation device 500, the navigation system 770, the sensing unit 120, the interface 130, and the memory 140. For example, the vehicle driving information may be received using at least one of the user interface device 200, the communication device 400, and the navigation system 770, and the vehicle driving information may include destination information which is to be stored in the memory 140. Once a user inputs a destination using at least one of the user interface device 200, the communication device 400, and the navigation system, the controller 170 may store destination information about the destination in the memory 140.

Based on destination information and location information of the vehicle 100, the controller 170 may determine whether the vehicle 100 enters a set distance from a preset destination. The set distance may be a value stored in the memory 140 and may be set by the user.

The controller 170 may sense a user command, received in the user interface device 200 or the communication device 400, to determine whether a stop request has been received.

When the vehicle enters the set distance from the preset destination or the stop request is received, the controller 170 may search for at least one available stopping area based on acquired vehicle driving information in S300.

An available stopping area indicates an area of a certain width where the vehicle 100 can to stop. At least one available stopping area may or may not exist. When there are two or more available stopping areas, each of them may have different size, location, and shape. The fact that there is no available stopping area means that there is no area for the vehicle 100 to stop in the vicinity.

The controller 170 may search for at least one available stopping area based on acquired vehicle driving information. The vehicle driving information may include information provided from at least one of the user interface device 200, the object detection device 300, the communication device 400, the driving manipulation device 500, the navigation system 770, the sensing unit 120, the interface 130, and the memory 140. For example, the vehicle driving information may include object information detected by the object detection device 300. Based on object information, the controller 170 may determine an obstacle, a nearby vehicle, a pedestrian, a traffic line, a traffic signal, a structure, and a building existing within a specific distance from the vehicle. The controller 170 may search for an available stopping area by determining, based on vehicle information including object information, where is an area for the vehicle 100 to stop.

The controller 170 may display information on the found available stopping area on the display unit 251 or transmit the same to a preset terminal in S400.

The information on the found available stopping area may include a map screen on which the available stopping area found by the controller 170 is marked, and location and distance information of the available stopping area.

Figure 9A:
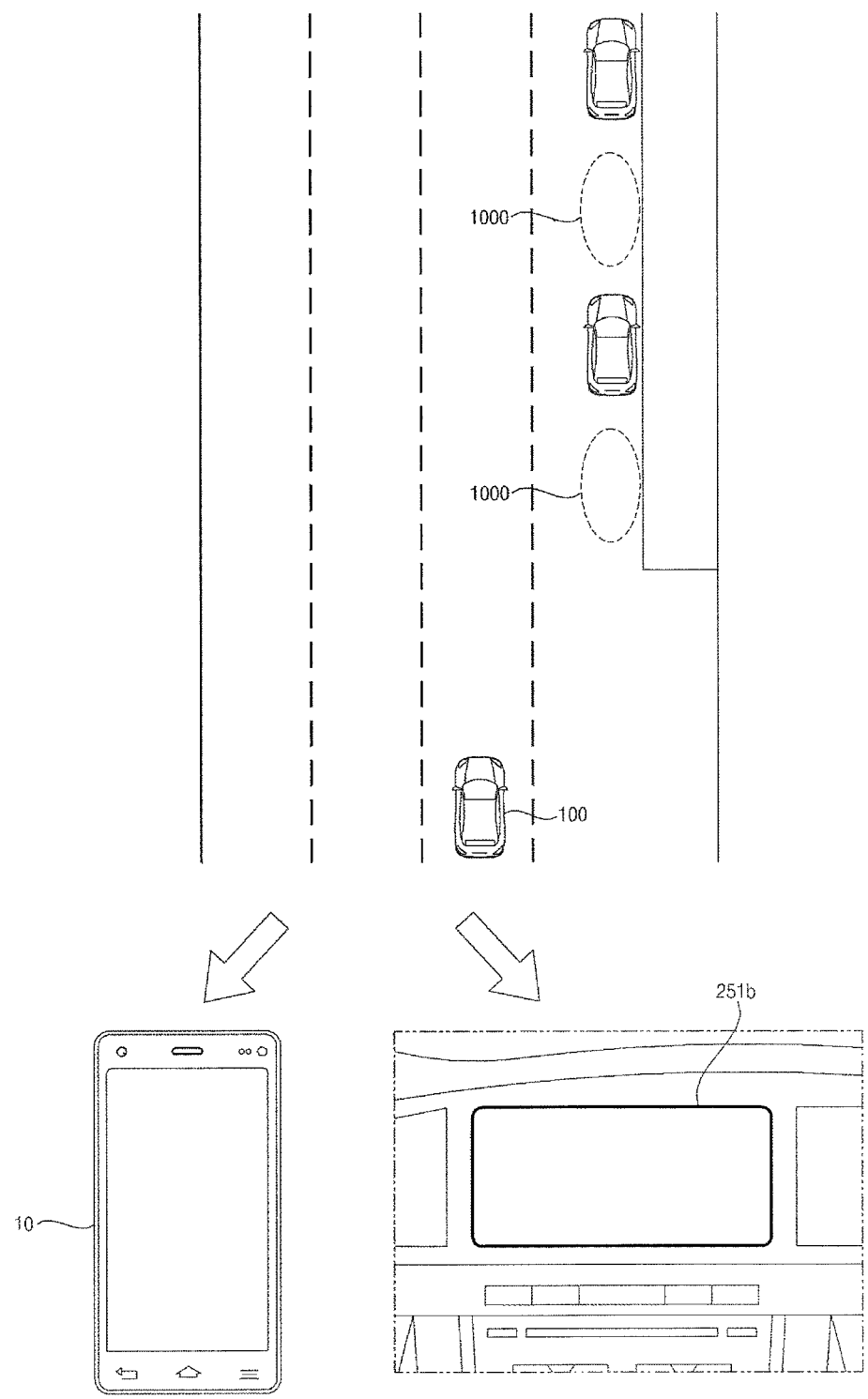
FIGS. 9A and 9B are diagrams illustrating an example display unit and an example terminal displaying an available stopping area.
Figure 9B:
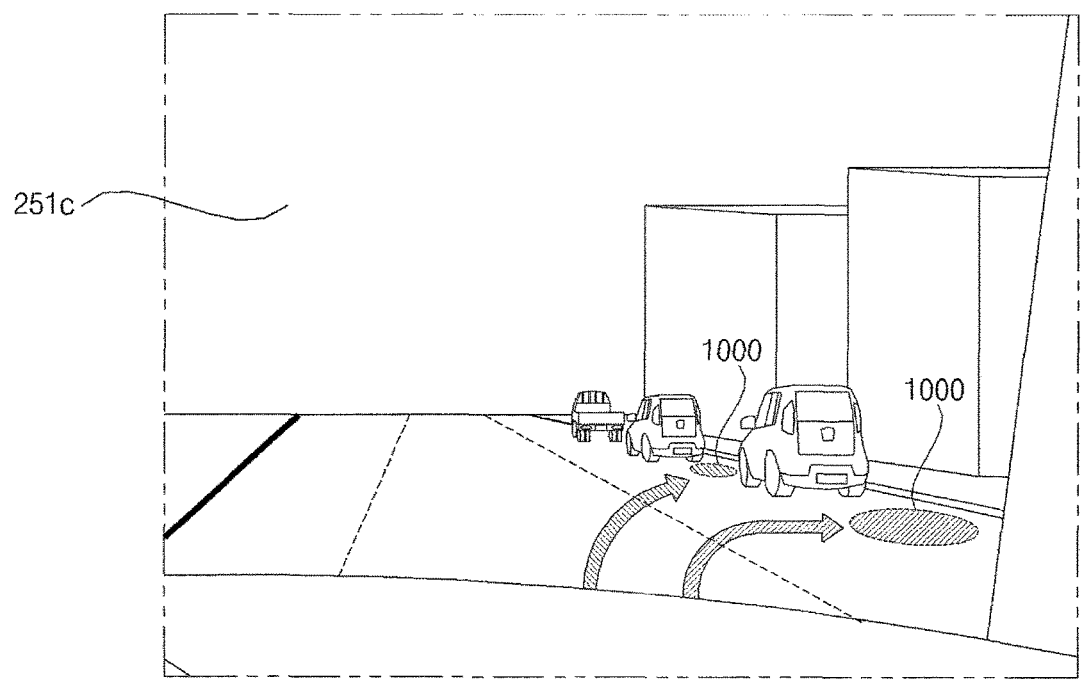

FIGS. 9A and 9B illustrate an example display unit and an example terminal displaying an available stopping area.

The display unit 251 may include a transparent display implemented in a windshield or a window, a Head Up Display (HUD), a Center Information Display (CID) 251b, and a Rear Seat Entertainment (RSE). The controller 170 may display a map image on which an available stopping area is indicated, and location and distance information of the available stopping area on at least one of the transparent display, the HUD, the CID 251b, and the RSE.

Referring to FIG. 9A, the controller 170 may display a top-view image, which shows a found available stopping area 1000, on the CID 251b. In addition, the controller 170 may transmit a top view image, which shows the available stopping area 1000, to a preset terminal 10.

The preset terminal 10 may be a user's terminal. In this case, a top view image showing the found available stopping area 1000 may be displayed on the screen of the terminal 10. The user is able to check the found available stopping area 1000 or direct the vehicle 100 to stop at a specific location even when the user is not inside the vehicle 100.

Referring to FIG. 9B, the controller 170 may display a found available stopping area 1000 in augmented reality (AR) using an HUD or the transparent display 251c implemented in the windshield. In this case, the user is able to see a specific mark 1000 shown in an available stopping area.

Hereinafter, detailed description about a case where the controller 170 determines an available stopping area will be provided with reference to FIGS. 10 to 13.

Based on object information provided from the object detection device 300, the controller 170 may determine that an area where a parking or stopping-allowed line exists on a roadway on which the vehicle 100 is now travelling is an available stopping area.

Figure 10:
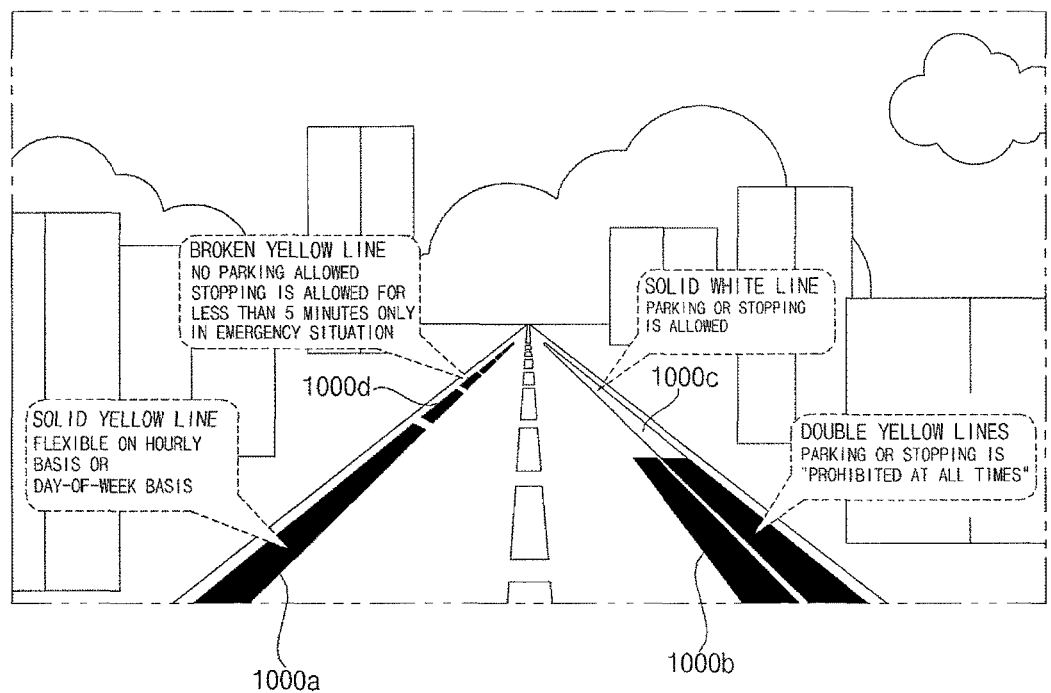
FIG. 10 is a diagram illustrating example parking lines and example stopping-allowed lines.

FIG. 10 illustrates example parking lines and example stopping-allowed lines.

In some implementations, the parking lines or the stopping-allowed lines can be lines on a road. In some other implementations, the parking lines or the stopping-allowed lines can be color curbs. A type or color of a line may indicate a degree of allowance of parking or stopping a vehicle according to regulations. For example, a broken yellow line 1000d on the side of the roadway may be a line that allows stopping for less than 5 minutes. A solid white line 1000c on the side of the roadway may be a line that allows parking or stopping anytime. A solid yellow line 1000a on the side of the road may be a line that allows stopping on an hourly basis or a day-of-week basis. Double yellow lines may be lines that prohibit parking or stopping. Each country or region may have different regulations on the types and colors of lines.

The object detection device 300 may detect an object existing within a specific distance from the vehicle 100, and provide information on the object to the controller. The object includes a traffic line. A signal or information provided by the object detection device 300 to the controller 170 may be referred to as object information. The object information is included in vehicle driving information.

Based on object information included in vehicle driving information, the controller 170 may determine a type, a location, and color of a traffic line existing in the vicinity of the vehicle 100. For example, based on object information, the controller 170 may distinguish a broken line and a solid line, distinguish color of a line, and determine a location of each line.

In some implementations, the controller 170 may determine that an area where the broken yellow line 1000d or the solid white line 1000c exists on the road is an available stopping area. However, if a stop period of the vehicle 100 is set in advance to less than 5 minutes, the controller 170 may determine that an area where only the solid white line 1000c exists is an available stopping area. If the broken yellow line 1000a is detected and it is determined that hours during which the vehicle 100 will be stopped corresponds to stopping allowed hours of the solid yellow line 1000a, the controller 170 may determine that an area outlined by the solid yellow line 1000a is an available stopping area.

In some other implementations, based on object information provided by the object detection device 300, the controller 170 may determine that an area having a space for the vehicle 100 to enter and stop is an available stopping area.

The object detection device 300 may detect an object existing within a specific distance from the vehicle 100. The object may include an obstacle, a nearby vehicle, a pedestrian, and any other object of certain volume. Based on the object information, the controller 170 may detect an object existing around the vehicle 100. The controller 170 may determine volume of a space that exists in a specific area.

Based on object information, the controller 170 may determine whether there is a space large enough for the vehicle 100 to stop. If it is determined, based on the object information, that there is a space for the vehicle 100 to enter and stop, the controller 170 may determine that an area having such a space is an available stopping area.

Figure 11:
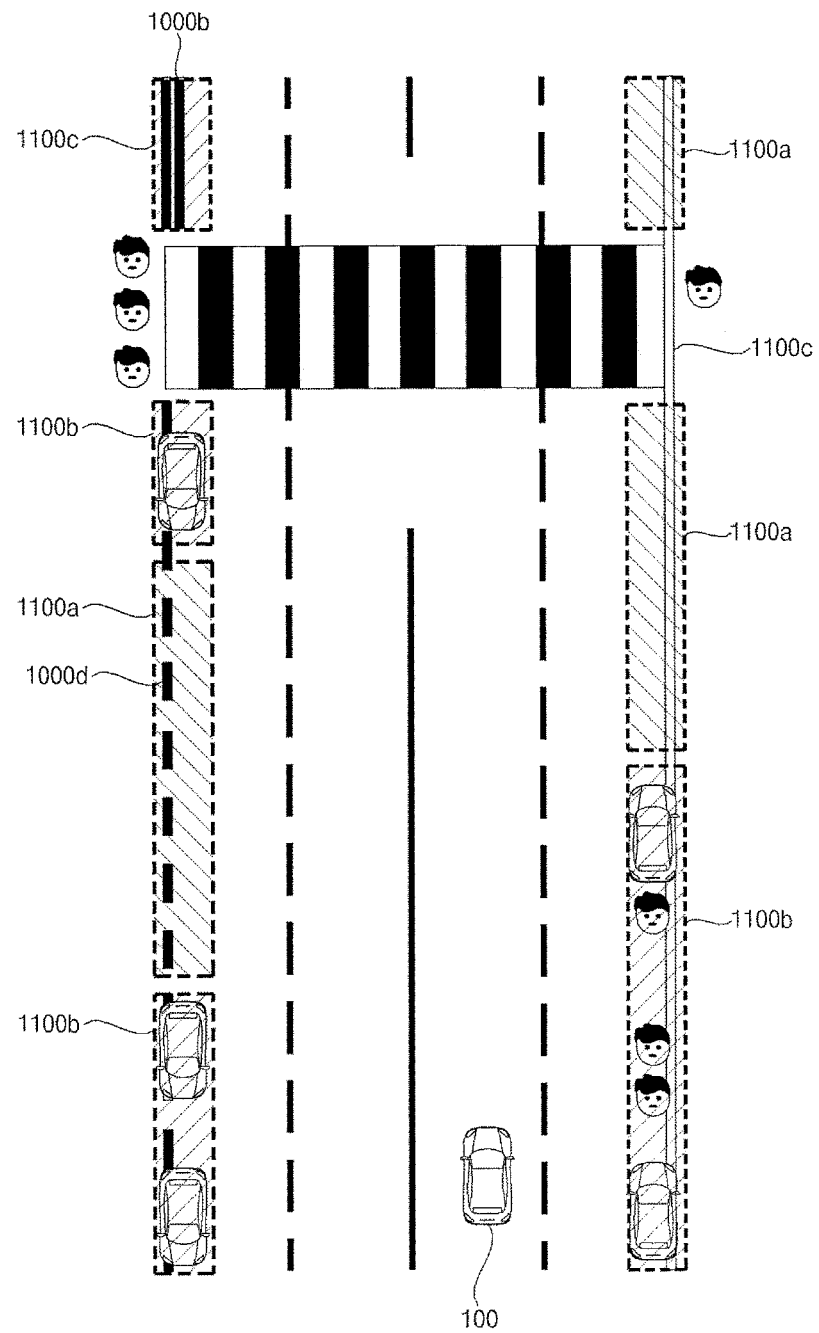
FIG. 11 is a diagram illustrating an example vehicle that determines whether a particular area is an available stopping area.

FIG. 11 illustrates an example vehicle that determines whether a particular area is an available stopping area.

In the example illustrated in FIG. 11, based on object information, the controller 170 may determine that an area in which a parking or stopping-allowed line exists, no other object is present, and there is a space for the vehicle 100 to enter and stop is an available stopping area 1100a.

For example, the parking or stopping-allowed line may be a broken yellow line 1000d and a solid white line 1000c.

Based on object information, the controller 170 may determine that an area 1100a in which no other object is present in the entire area outlined by the broken yellow line 1000d and which has a space for the vehicle 100 to stop is an available stopping area. Based on the object information, the controller 170 may determine that an area 1100b is not an available stopping area despite the broken yellow line 1000d on the left side of the roadway, because an object is present in the area 1100b.

Based on the object information, the controller 170 may determine that there is the solid white line 1000c on the right side of the roadway. The controller 170 may determine that an area 1100a in which no other object is present in the entire area outlined by the solid white line 1000c and which has a space for the vehicle 100 to stop is an available stopping area. The controller 170 may determine that the area 1100b in the area outlined by the solid white line 1000c is not an available stopping area, because a nearby vehicle is present in the area 1100b and thus the vehicle 100 is not allowed to enter.

Based on the object information, the controller 170 may determine that there is double solid yellow lines 1000b on the left side of the roadway. The controller 170 may determine that an area outlined by the double solid yellow lines 1000b is not an available stopping area.

Figure 12:
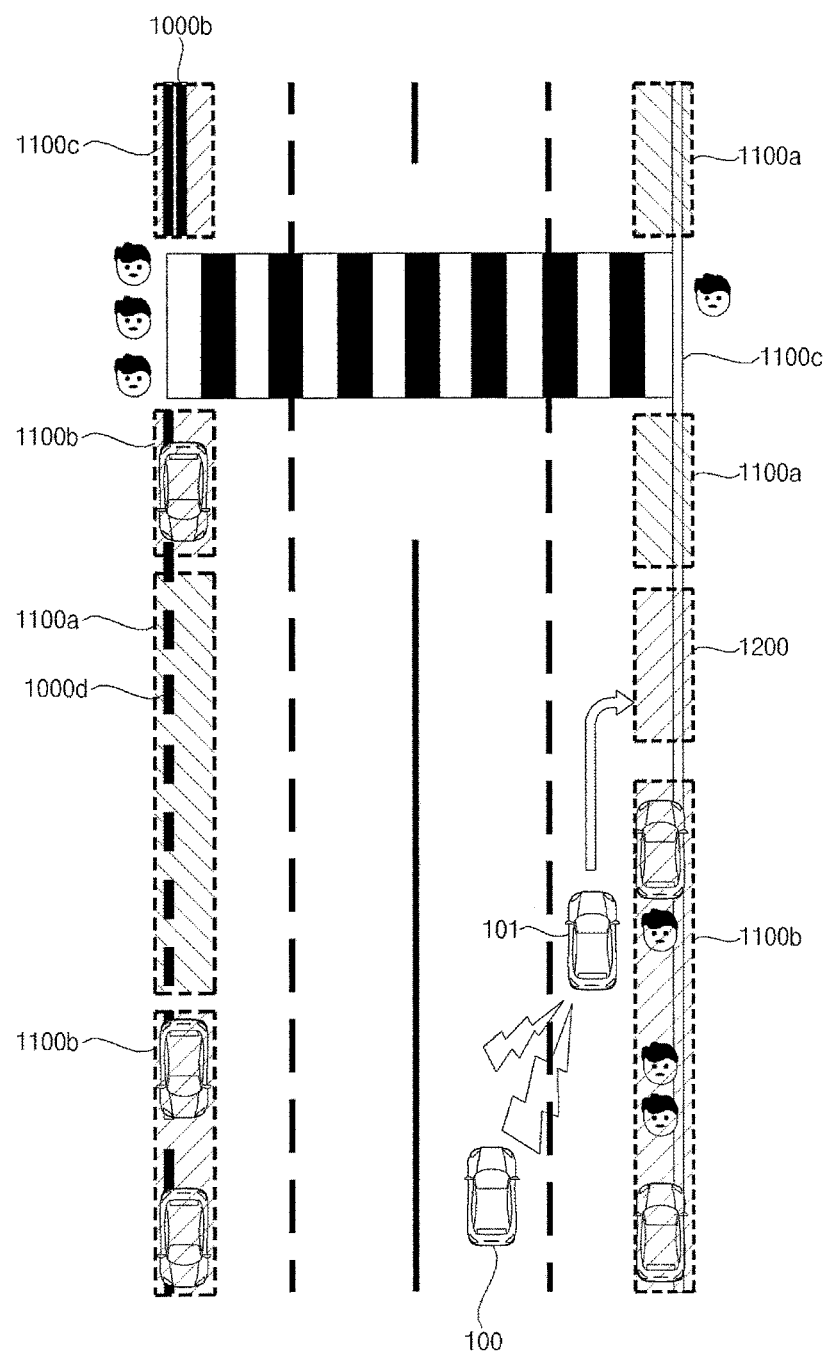
FIG. 12 is a diagram illustrating an example vehicle that determines whether a particular area is not an available stopping area.

FIG. 12 illustrates an example vehicle that determines whether a particular area is not an available stopping area.

In the example illustrated in FIG. 12, based on information received through the communication device 400, the controller 170 may determine that an area 1200 already assigned to a nearby vehicle 101 to stop is not an available stopping area.

Using the communication device 400, the controller 170 may receive information transmitted by a different device. The different device may include a nearby vehicle, a mobile terminal, and a server.

Using the communication device 400, the controller 170 may receive information transmitted by the nearby vehicle 101. The nearby vehicle 101 may select an area desired to stop, and information on the selected area 1200. The information on the selected area 1200 may include information on a location of the selected area 1200.

If the information on the selected area 1200, transmitted by the nearby vehicle 101, is received, the controller 170 may determine that the area 1200 is an area already assigned to the nearby vehicle 101 to stop. The controller 170 may determine that the area already assigned to the nearby vehicle 101 to stop is not an available stopping area.

Figure 13A:
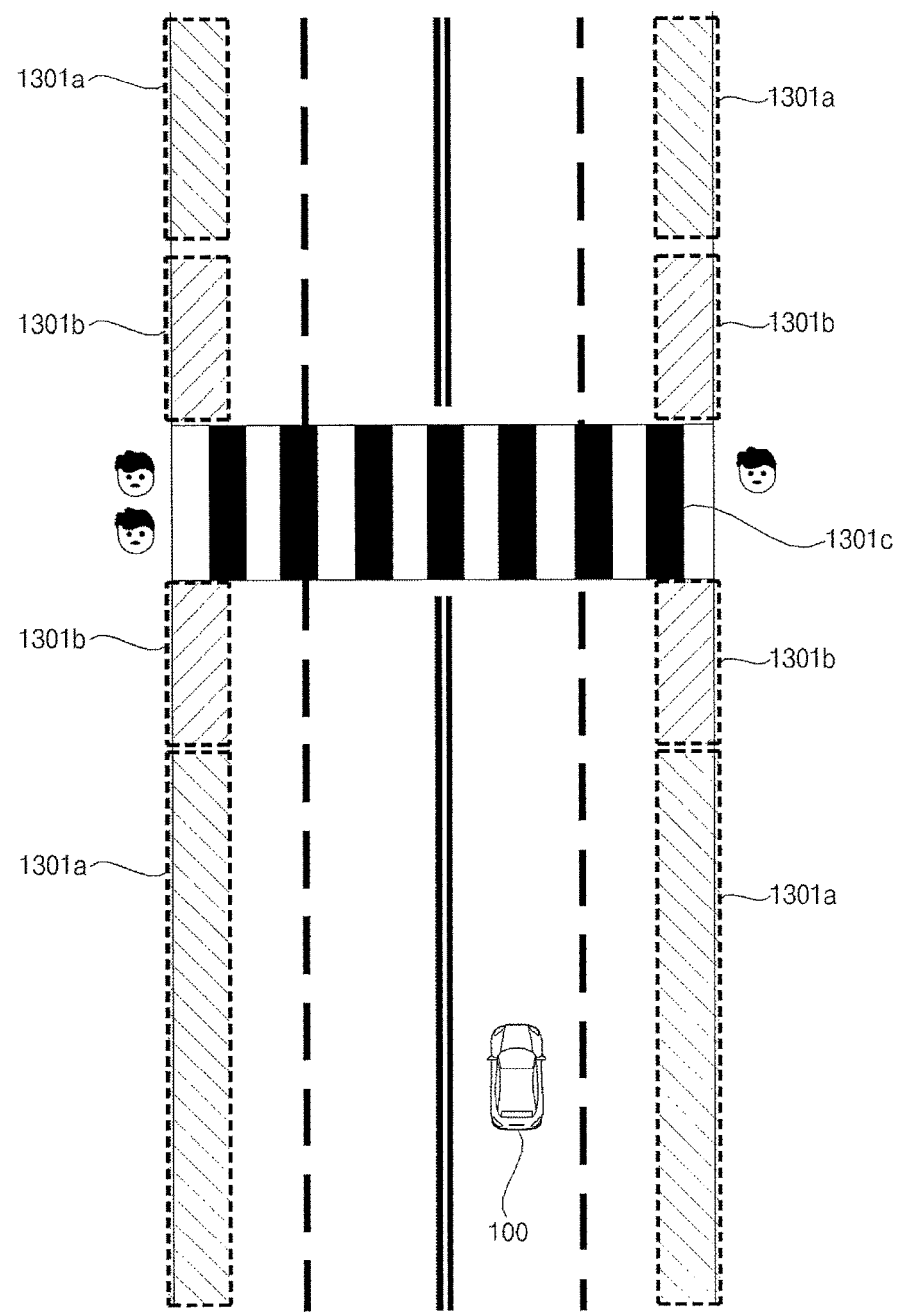
FIGS. 13A to 13C are diagrams illustrating another example vehicle that determines whether a particular area is not an available stopping area.
Figure 13B:
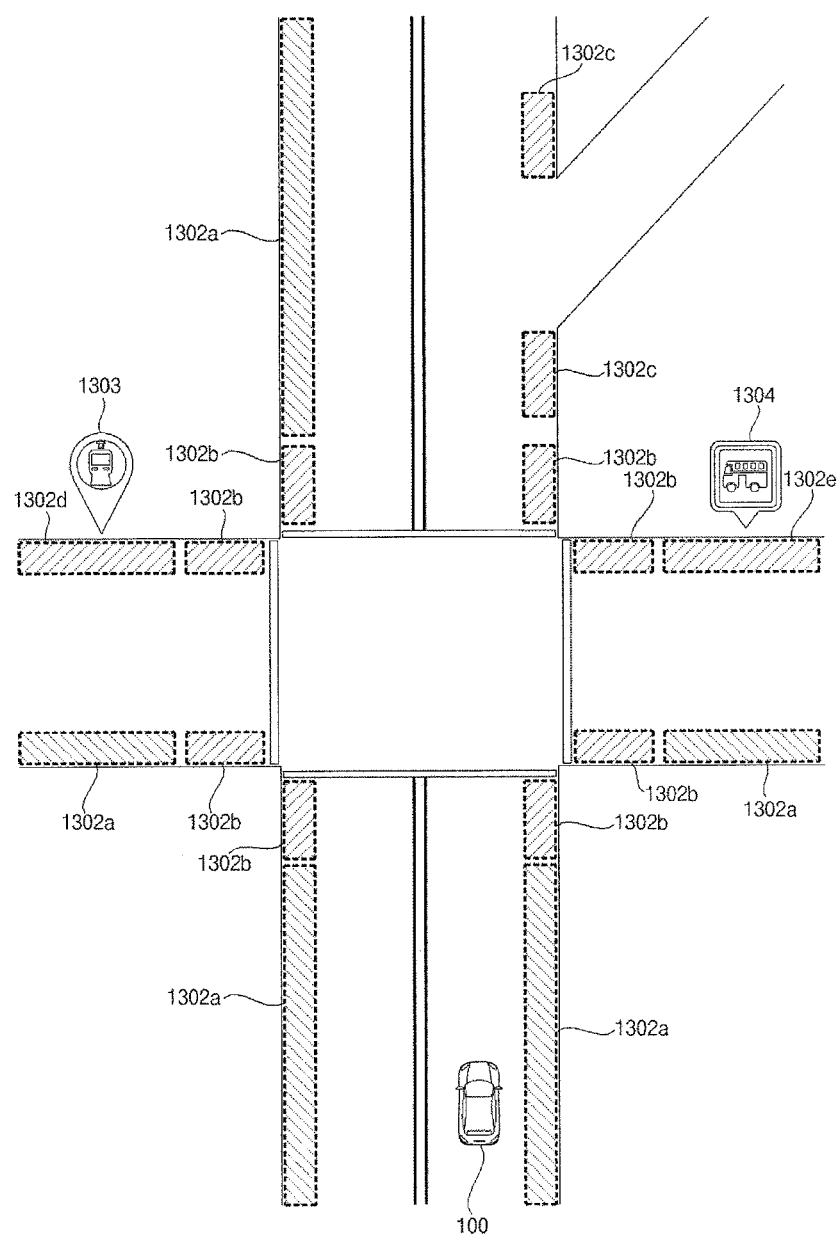
Figure 13C:
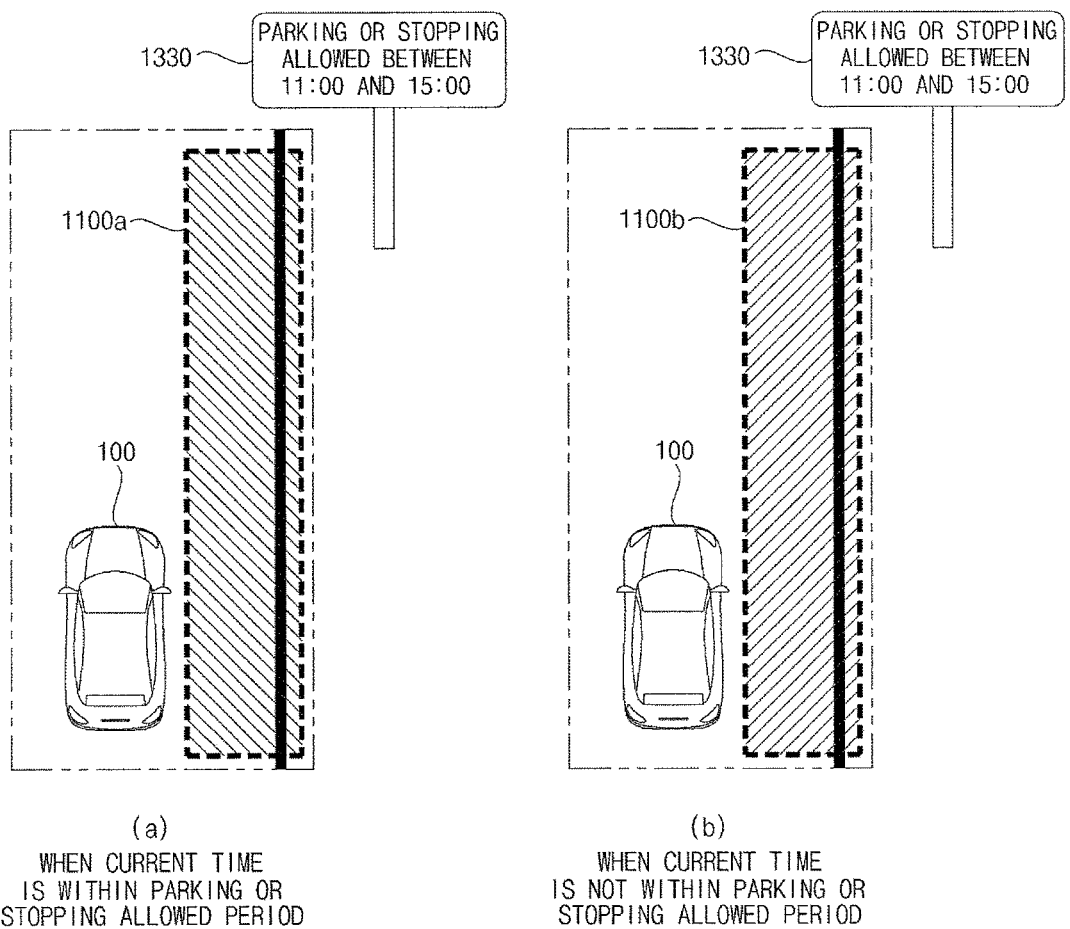

FIGS. 13A to 13C illustrate another example vehicle that determines whether a particular area is not an available stopping area.

In the examples illustrated in FIGS. 13A to 13C, based on at least one of object information, map information, and regulation information, the controller 170 may determine that an area within a legal distance from an illegal stopping area, a bus stop, a taxi stand, a subway station, a train station, an intersection, a ramp, a traffic structure, an access road, or two or more thereof is not an available stopping area.

Vehicle driving information may include object information, map information, and regulation information. The map information may include map images provided by the navigation system 770. The map information may include information about a type/shape/width of a road, a traffic light, a crosswalk, a footbridge, an underground passageway, a stop, and any other road infrastructure or structure. The regulation information may be information on regulations on parking or stopping of a vehicle. The regulation information may be updated through the network.

For example, based on at least one of object information, map information, and regulation information, the controller 170 may determine that a specific area determined to be an illegal stopping area is not an available stopping area. The illegal stopping area may include an area existing within a legal distance from any one among a bus stop, a taxi stand, a subway station, a train station, an intersection, a ramp, a traffic structure, an access road. The legal distance may be determined based on the regulation information or may be set by a user.

FIGS. 13A to 13C are diagrams for explanation of a case where an autonomous vehicle according to the present invention determines that an illegal stopping area is not an available stopping area.

Referring to FIG. 13A, based on object information or map information, the controller 170 may determine that a crosswalk 1301c exists within a specific distance from the vehicle 100. Based on regulation information, the controller 170 may determine that an area 1301b within a legal distance from the crosswalk 1301c is not an available stopping area. For example, the controller 170 may determine that an area having 10 meter from the crosswalk 1301c is not an available stopping area.

Except the area 1301b within the legal distance from the crosswalk 1301c, the controller 170 may determine that the area 1301a on the both sides of the roadway is an available stopping area.

Referring to FIG. 13B, based on object information or map information, the controller 170 may sense an intersection. Based on regulation information, the controller 170 may determine that an area 1302b within a legal distance from the intersection is not an available stopping area. A number of vehicles make turns to the right or the left at the intersection, so, if a vehicle is stopped at the intersection, it will block vision of other vehicles.

The controller 170 may determine that areas 1302d and 1302e within a legal distance from a subway station 1303 or a bus stop 1304 are not available stopping areas. The controller 170 may determine that an area 1303c existing within a legal distance from an access road is not an available stopping area.

The controller 170 may determine that an area 1302a on the side of the roadway is an available stopping area, except the areas 1302b, 1302c, 1302d, and 1302e which are determined not to be an available stopping area.

Referring to FIG. 13C, if it is determined, based on at least one of object information, map information, and regulation information, that an area is allowed between certain hours, the controller 170 may determine that the area is an available stopping area only during the parking allowed hours.

For example, based on object information, the controller 170 may sense a traffic sign plate 1330 indicating stopping allowed hours, and determine contents of the traffic sign plate 1330. For example, if a solid yellow line allows stopping between certain hours and the traffic sign plate 1330 indicates that stopping is allowed between 11:00 and 15:00, the controller 170 may determine that an area outlined by the solid yellow line is an available stopping area between 11:00 and 15:00.

Referring to (a) of FIG. 13C, if the current time is within stopping allowed hours, the controller 170 may determine that an area outlined by a solid line is an available stopping area 1100a. For example, if stopping allowed time hours are between 11:00 and 15:00 and the current time is 12:00, the controller 170 may determine that an area outlined by a solid line is the available stopping area 1100a. Even in such a case, if a pre-input scheduled time period of the vehicle 100 indicates that the vehicle 100 will remain stopped even after 15:00, the controller 170 may determine that the area outlined by the solid line is not an available stopping area.

Referring to (b) of FIG. 13C, if the current time is not within stopping allowed hours, the controller 170 may determine that an area outlined by a solid line is an unavailable stopping area 1100b. For example, if a legal time allowed for stopping is between 11:00 and 15:00 and the current time is 10:00, the controller 170 may determine that an area outlined by a solid line is the unavailable stopping area 1100b. In such a case, the controller 170 may display, on the display unit 251 provided inside the vehicle 100, a message notifying that stopping will be allowed in one hour.

Figure 14:
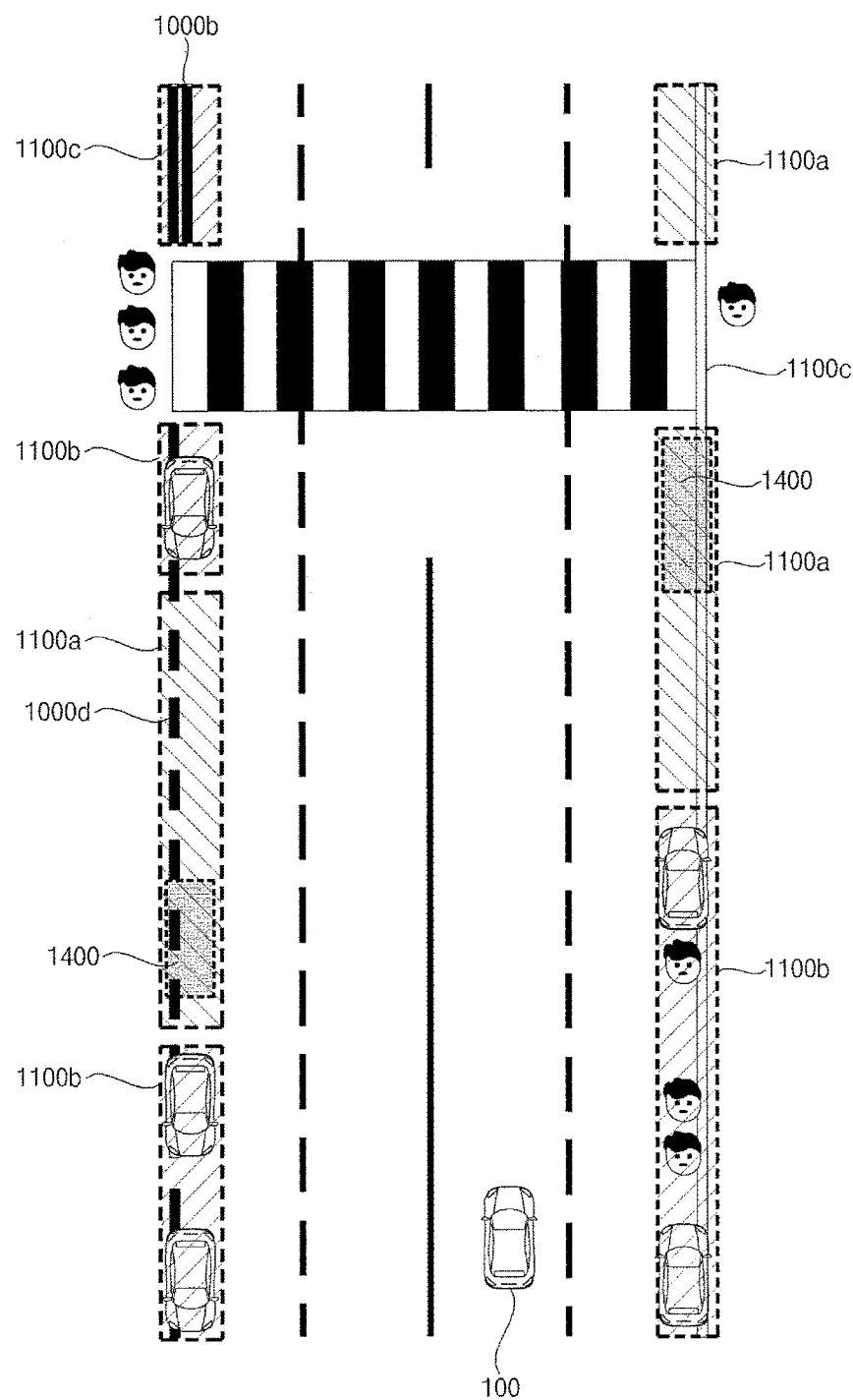
FIG. 14 is a diagram illustrating an example vehicle that determines whether a particular area is a recommended area among one or more available stopping areas.

FIG. 14 illustrates an example vehicle that determines whether a particular area is a recommended area among one or more available stopping areas.

In the example illustrated in FIG. 14, based on vehicle driving information, the controller 170 may determine a recommended area in a found available stopping area. The controller 170 may display information about the recommended area on the display unit 251 or transmit such information a preset terminal.

A recommended area 1400 may be part of an available stopping area 1100a. The recommended area 1400 may be an area where parking the vehicle 100 is relatively advantageous.

For example, the recommended area 1400 may be an area which the vehicle 100 can arrive at the earliest time in an available stopping area, an area closest to a destination, an area from which a user can reach a destination at the earliest time, an area which is most safe, or an area which fits a user's desired stopping type.

The controller 170 may determine not just an available stopping area but a recommended area, and display information about the recommended area through the display unit 251 or a terminal, thereby helping a user to decide where to stop the vehicle 100. In this case, the user may select the recommended area or a different space in the available stopping area.

At last, the controller 170 may control the vehicle 100 to stop at a point selected by the user. If the vehicle drive device 600 provided in the vehicle 100 operates in accordance with a control signal of the controller 170, the vehicle 100 may move to a selected stopping location and stop there.

FIGS. 15 to 20 illustrate example vehicles that determines whether a particular area is a recommended area.

Figure 15:
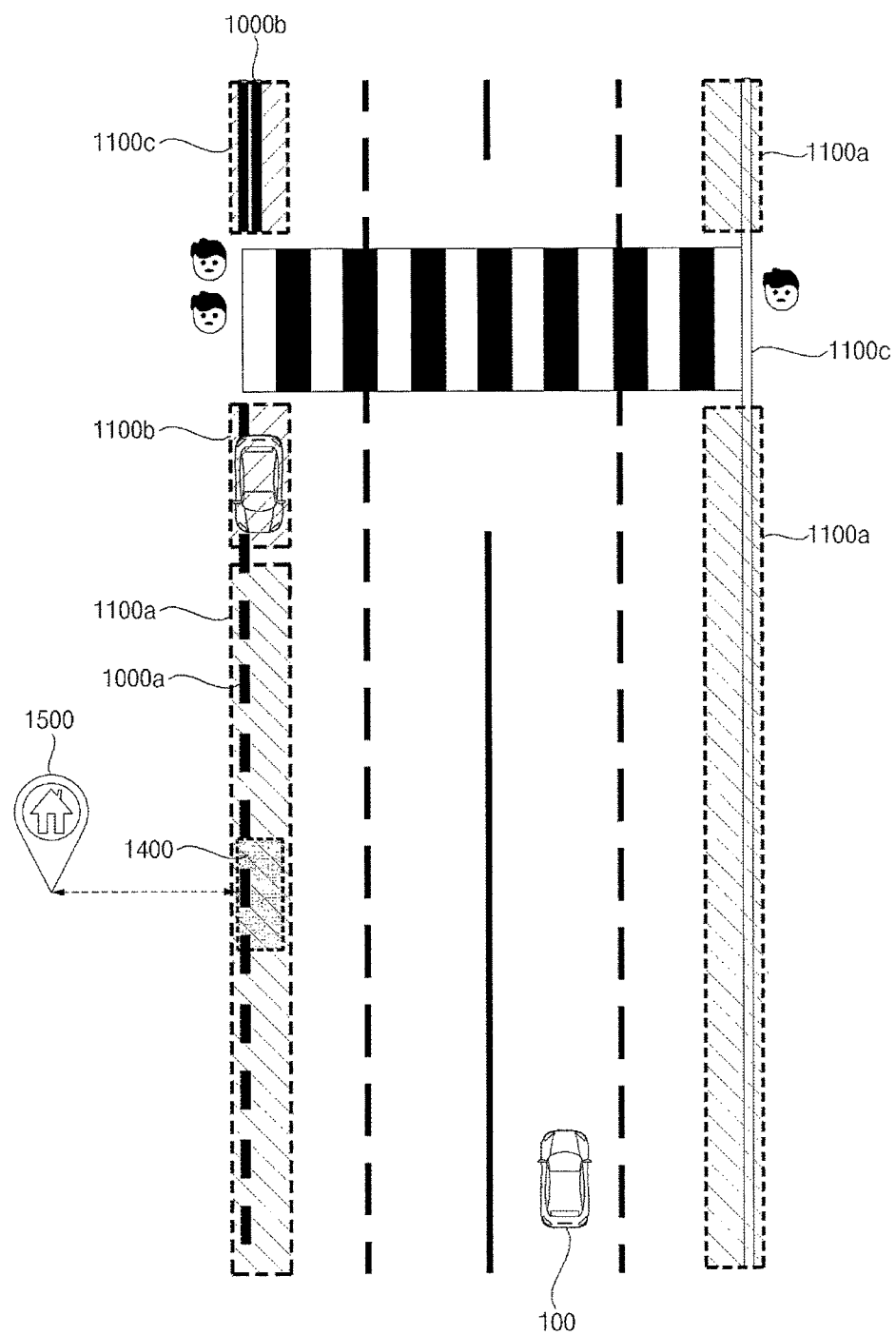
FIG. 15 is a diagram illustrating an example vehicle that determines whether a particular area is a recommended area that is the closest to a destination by a distance.

FIG. 15 illustrates an example vehicle that determines whether a particular area is a recommended area that is the closest to a destination by a distance.

Based on map information, the controller 170 may determine that an area 1400, in which the vehicle 100 is able to stop as close as possible to a preset destination 1500 within a found available stopping area 1100*a*, is a recommended area.

Based on map information included in vehicle driving information, the controller 170 may determine a location of an area which is closest to the preset destination 1500 within the available stopping area 1100*a*.

In this case, the recommended area 1400 is a space within the available stopping area 1100*a*, which is at the closest distance to the preset distance 1500, and therefore, it is possible to reduce a distance that a user needs to walk from the destination 1500 to the vehicle 100 or from the vehicle 100 to the destination 1500.

The controller 170 may display, on the display unit 251, the recommended area 1400 closest to the preset destination 1500. If a user input which selects the recommended area 1400 is received through the user interface device 300, the controller 170 may control the vehicle to move to the recommended area 1400. In this case, the vehicle 100 may move to the recommended area 1400 by going straight and then making a U-turn.

If a user selects a different area other than the recommended area 1400 in the available stopping area 1100*a*, the controller 170 may control the vehicle 100 to stop at the selected area.

Figure 16:
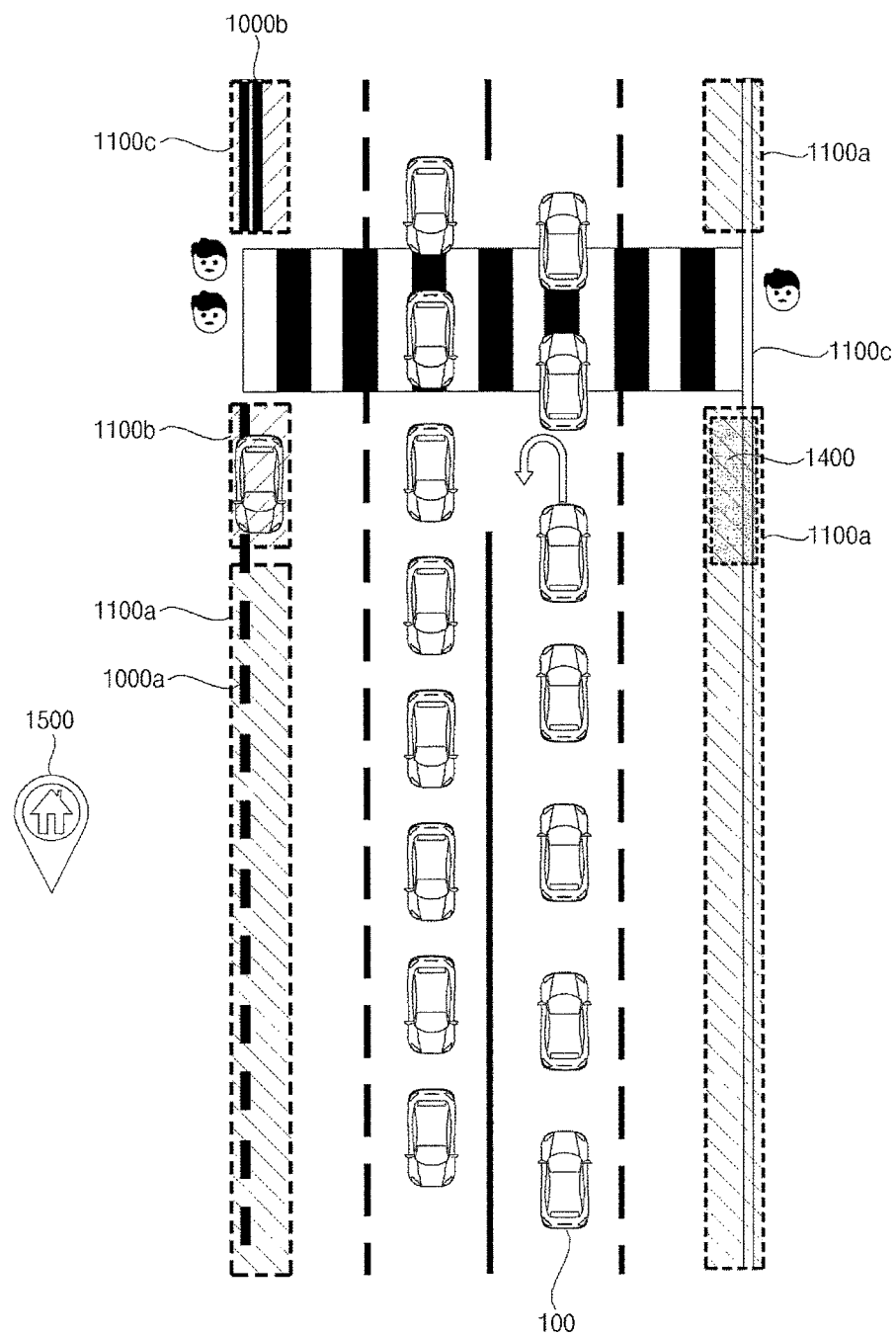
FIG. 16 is a diagram illustrating an example vehicle that determines whether a particular area is a recommended area that is the closest to a destination by time.

FIG. 16 illustrates an example vehicle that determines whether a particular area is a recommended area that is the closest to a destination by time.

Based on at least one of map information, traffic information, and location information, the controller 170 may determine that an area having the smallest sum of a first time and a second time within the found available stopping area 1100*a* is a recommended area. The first time is a time required for the vehicle 100 to completely stop in the found available stopping area 1100*a*, and the second time is a time required for a user to reach a destination 1500 from a location at which the vehicle 100 is stopped.

In a case where the vehicle 100 plans to stop at a point closest to a destination in the available stopping area 1100*a*, if it takes a long time for the vehicle 100 to reach the point, a user is better to get off the vehicle 100 and walk to the destination in order to arrive there more quickly. In such a case, the autonomous vehicle 100 according to the present invention determines that a point having the smallest sum of the first time, required for the vehicle 100 to reach a desired stopping location, and the second time, required for a user to get off the vehicle 100 and walk to the destination 1500, is a recommended area, and therefore, it is possible to reduce the time for the user to reach the destination 1500.

The controller 170 may calculate the first time, which is required for the vehicle 100 to reach each point in the available stopping area 1100*a*, based on map information, traffic information, and location information.

The traffic information may include signal information of a traffic light and information about a real-time amount of traffic. The traffic information may be information received from a server that provides real-time traffic information. Accordingly, the more number of vehicles around the available stopping area 1100*a*, the longer the first time can be.

Based on traffic information, the controller 170 may determine a signal transition time of a traffic light. Based on an amount of traffic and the signal transition time of the traffic light, the controller 170 may determine the first time.

The controller 170 may calculate the second time, which is required for a user to reach the destination 1500 from a location at which the vehicle 100 will stop, based on map information, traffic information, and location information.

Based on map information, the controller 170 may determine a path and a distance, which are required for the user to move to the destination 1500 by foot.

Based on traffic information, the controller 170 may determine a signal transition time of a pedestrian signal. If a user disembarks at a certain location to walk across a crosswalk, the controller 170 may determine, based on the signal transition time of the pedestrian signal, a time required for the user to walk across the crosswalk. If a user disembarks in an available stopping area on the right side of the roadway, the controller 170 may calculate a second time by taking into account how long it takes for the user to walk across a crosswalk.

For example, if there are a huge amount of traffic or it takes a long time until a signal is changed, a user may be better to walk to a destination by foot, rather than driving the vehicle 100 to a point closest to the destination. The controller 170 may calculate a sum of the first time and the second time in the case (a) where the vehicle 100 moves to an available stopping area closest to the destination 1500, and a sum of the first time and the second time in the case (b) where the vehicle 100 moves to an available stopping area 1400 closest to a crosswalk, and then the controller 170 may compare the results. If it is determined that the sum of the first time and the second time of the case (b) is smaller than that of the case (a), the controller 170 may determine that the available stopping area 1400 closest to the crosswalk is a recommended area.

Figure 17:
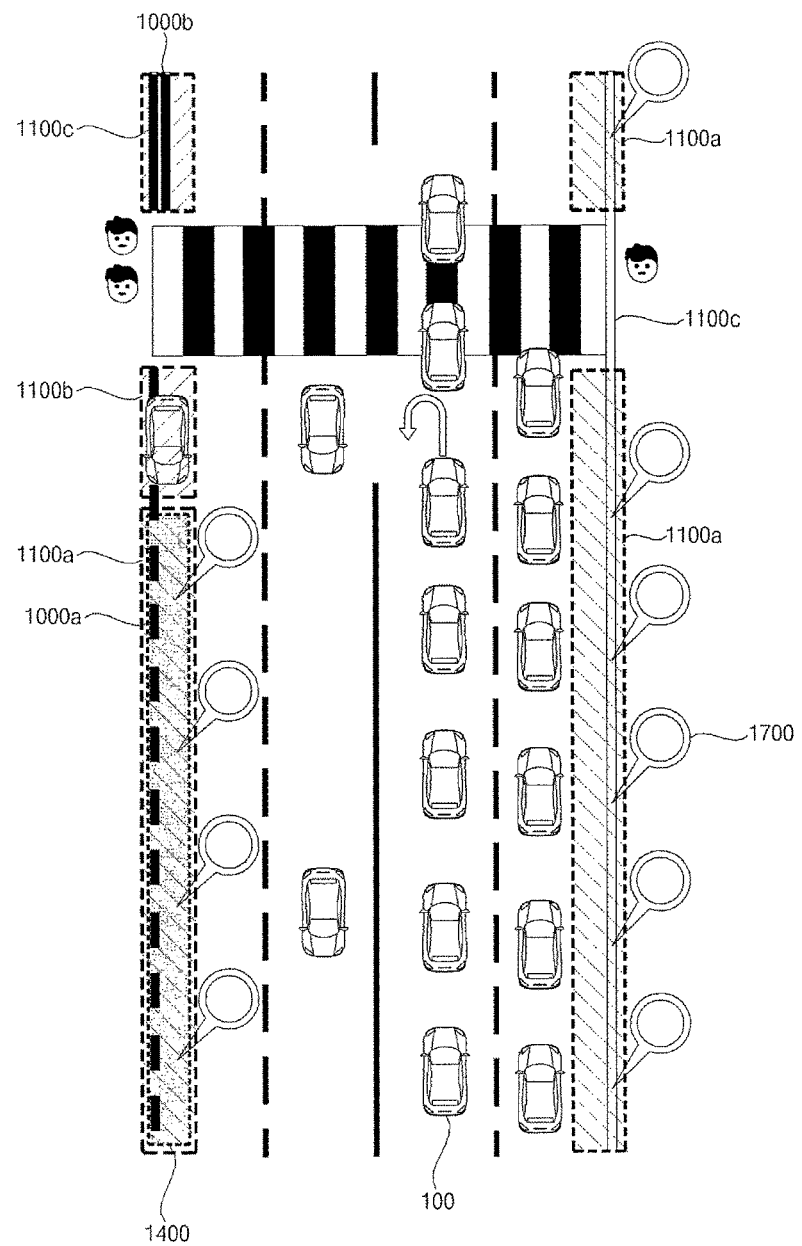
FIG. 17 is a diagram illustrating an example vehicle that determines whether a particular area is a recommended area based on a safety level.

FIG. 17 illustrates an example vehicle that determines whether a particular area is a recommended area based on a safety level.

The controller 170 may calculate safety level distribution in a found available stopping area 1100*a* based on object information, nearby vehicle information, and traffic information. The nearby vehicle information may be information transmitted by a nearby vehicle. The nearby vehicle information may include information about a location, a speed, a control status, a model, and an occupant of the nearby vehicle.

To calculate a safety level, the controller 170 may set at least one expected stopping location 1700 within the found available stopping area 1100*a*.

According to the width of the found available stopping area 1100*a* and the size of the vehicle, the controller 170 may determine a location of each expected stopping location 1700 and the number of expected stopping locations 1700. By calculating a safety level of each of the multiple expected stopping locations 1700, the controller 170 may calculate safety level distribution in the available stopping area 1100a.

A safety level may be a value indicating how much a corresponding area is safe. For example, an area having a relatively high safety level may be determined to be safer than an area having a relatively low safety level. A safety level may indicate a probability of the vehicle 100 to collide with a nearby vehicle while moving to a desired stopping area and an amount of traffic within a specific distance from the desired stopping area. For example, if the vehicle 100 is highly likely to collide with a nearby vehicle when moving to a desired stopping area, a safety level may be low. In another example, if there is a huge amount of traffic within a specific distance from the desired stopping area, it may result in a high probability of collision between the vehicle 100 and a nearby vehicle or the vehicle 100 may block vision or path of the nearby vehicle, and therefore, a safety level may be low.

To calculate a safety level, the controller 170 may perform, based on object information or nearby vehicle information, simulation of a case where the vehicle 100 moves to at least one expected stopping location 1700. The controller 170 may determine that a safety level is in inverse proportion to a probability of collision between the vehicle 100 and a nearby vehicle calculated through simulation. Accordingly, the controller 170 may determine that a lower safety level will be obtained if a higher collision probability is calculated through simulation.

To calculate a safety level, the controller 170 may determine, based on traffic information, that an amount of traffic within a set distance from at least one expected stopping location 1700 is in inverse proportion to a safety level of the expected stopping location 1700. The set distance may be a value determined through experiments. For example, the set distance may be a distance to a lane adjacent to an expected stopping location. The set distance may be a value set by a user.

In some implementations, based on at least one of object information, nearby vehicle information, and traffic information, the controller 170 may determine that a relatively greater number of vehicles exits in lanes on the right side of the roadway than those on the left side. The greater number of vehicles on the road means that the vehicle 100 is highly likely to collide with a nearby vehicle and that there is a huge amount of traffic in the vicinity of the vehicle 100. Thus, the controller 170 may determine that a safety level corresponding to expected stopping locations 1700 on the left side of the roadway is higher than a safety level corresponding to expected stopping locations 1700 on the right side. Accordingly, the controller 170 may determine that an available stopping area which corresponds to the expected stopping locations 1700 on the left side of the roadway is a recommended point 1400.

The controller 170 may determine that an area having a safety level equal to or greater than a set value in a found available stopping area 1100a is the recommended area 1400. The set value may be a value determined through experiments or may be set by a user. If there is no area having a safety level equal to or greater than a set value in the found available stopping area 1100a, the controller 170 may determine that an area having the highest safety level in the found available stopping area 1100a is the recommended area 1400.

Figure 18:
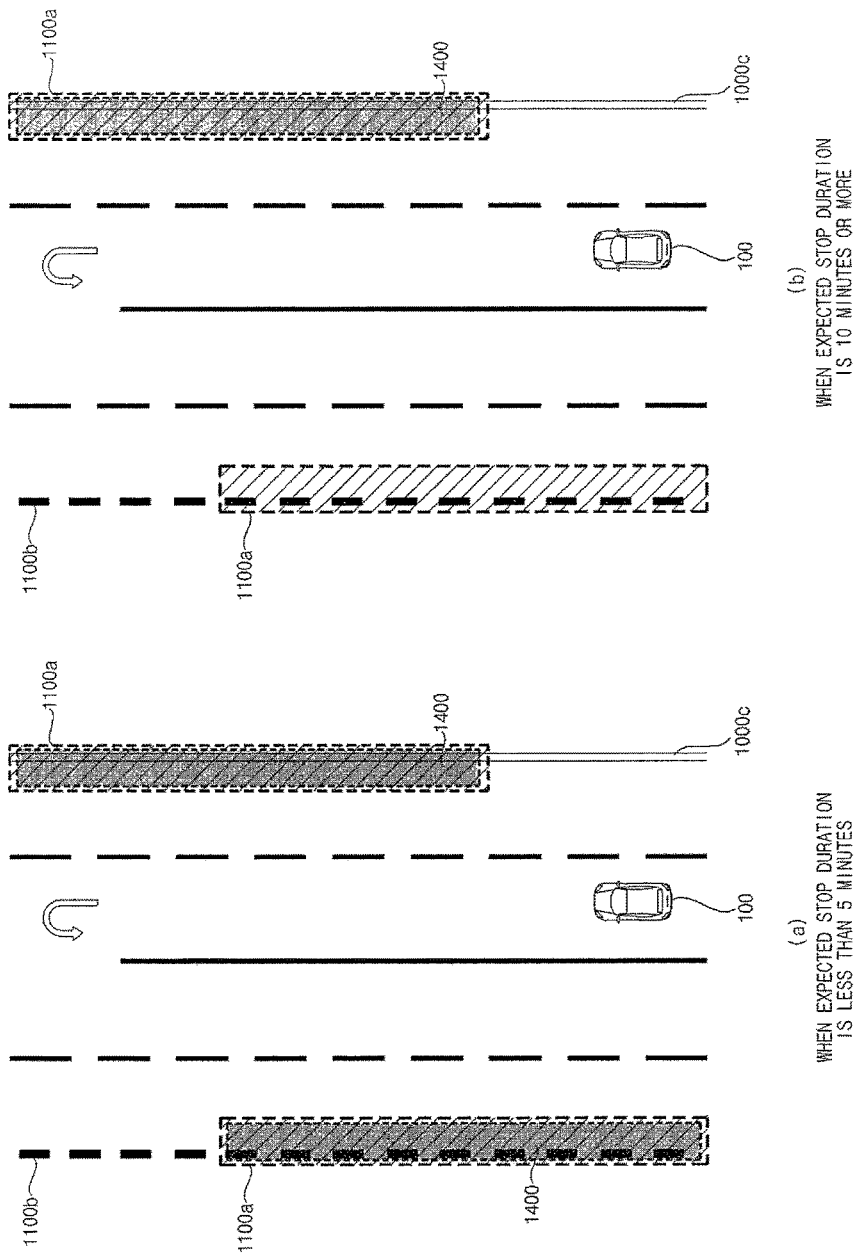
FIG. 18 is a diagram illustrating an example vehicle that determines whether a particular area is a recommended area based on an expected stop duration.

FIG. 18 illustrates an example vehicle that determines whether a particular area is a recommended area based on an expected stop duration.

The controller 170 may determine an expected stop duration of the vehicle 100 based on stopping type information. Based on object information, the controller 170 may determine that an area corresponding to the expected stop duration of the vehicle 100 in a found available stopping area is a recommended area.

The stopping type information may be information that indicates a pre-input expected stop duration of the vehicle 100. The expected stop duration may indicate a length of time for which the vehicle 100 is stopped at a specific destination. For example, before or while driving the vehicle 100, a user may input information indicating that the vehicle 100 will be stopped at the specific destination for 10 minutes. As the user's input with regard to the expected stop duration is received through the user interface device 200, the controller 170 may store stopping type information in the memory 140. Vehicle driving information may include the stopping type information.

An area corresponding to an expected stop duration of the vehicle 100 may be an area which allows stopping for the expected stop duration. For example, if an expected stop duration is 10 minutes, an area which allows stopping for 10 minutes or more may be an area corresponding to the expected stop duration.

In an example (a) in FIG. 18, the controller 170 may determine, based on stopping type information, that an expected stop duration of the vehicle 100 is less than 5 minutes. Based on object information, the controller 170 may determine an area which allows stopping for less than 5 minutes within a found available stopping area 1100a. In a case where an area outlined by a solid white line 1000c allows stopping without time limit and an area outlined by a broken yellow line 1000b allows stopping for less than 5 minutes, each of the two areas may be an area corresponding to the expected stop duration of the vehicle 100. In this case, the controller 170 may determine that the entire available stopping area 1100a is a recommended area 1400.

In an example (b) shown in FIG. 18, the controller 170 may determine, based on stopping type information, that an expected stop duration of the vehicle 100 is 10 minutes or more. Based on object information, the controller 170 may determine which area allows stopping for 10 minutes or more within a found available stopping area 1100a. In a case where an area outlined by a solid white line 1000c allows stopping without a time limit and an area outlined by a broken yellow line 1100b allows stopping for less than 5 minutes, the area outlined by the solid white line 1000c may be an area corresponding to an expected stop duration. In this case, the controller 170 may determine that an area outlined by the solid white line 1000c in the found available stopping area 1100a is a recommended area 1400.

Figure 19:
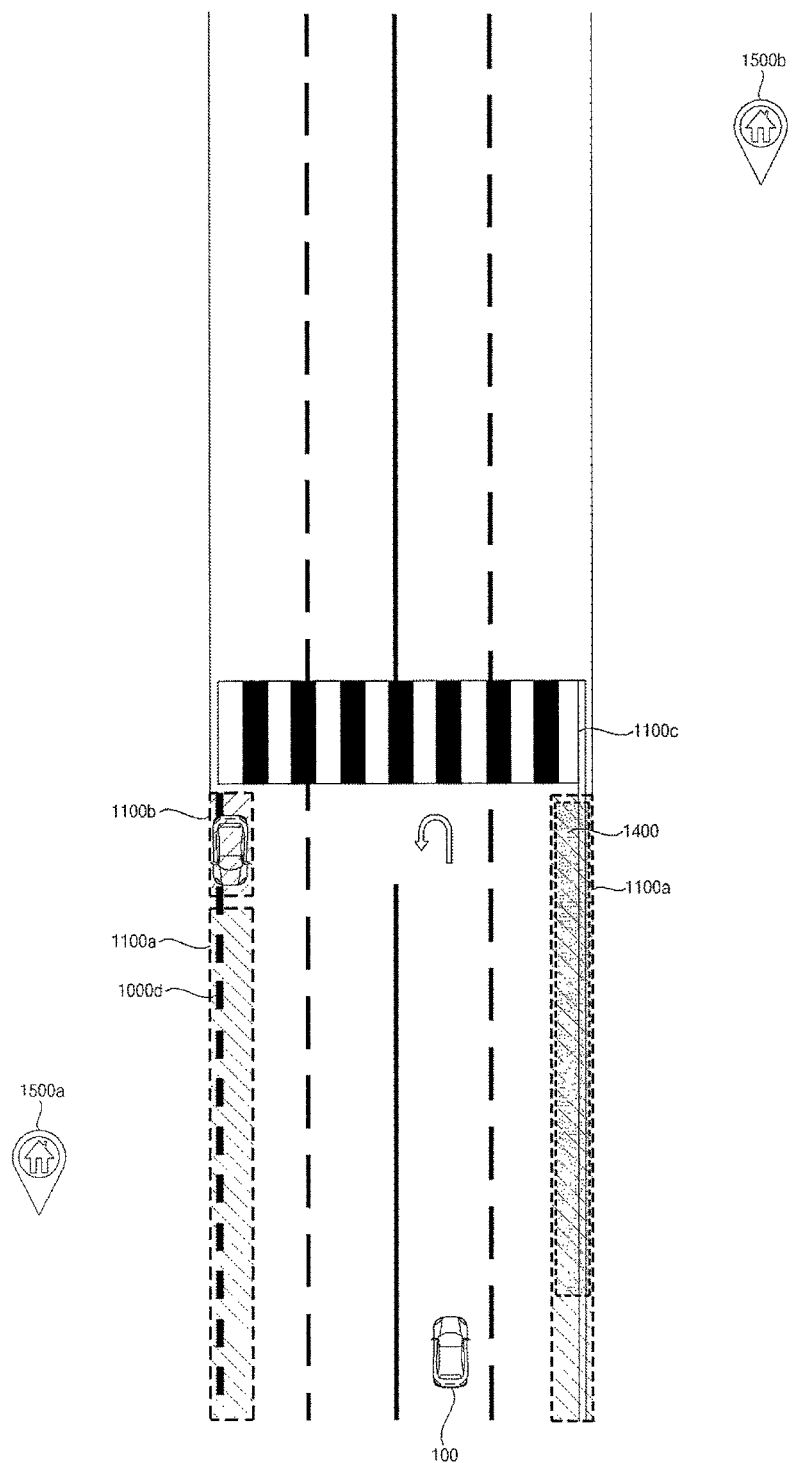
FIG. 19 is a diagram illustrating an example vehicle that determines whether a particular area is a recommended area based on a direction toward which the vehicle moves when the vehicle leaves the area for a destination.

FIG. 19 illustrates an example vehicle that determines whether a particular area is a recommended area based on a direction toward which the vehicle moves when the vehicle leaves the area for a destination.

When it is determined, based on destination information, that a destination 1500b after stopping has been set, the controller 170 may determine, based on map information and destination information, that an area adjacent to a lane toward the destination 1500b within the found available stopping area 1100a is a recommended area 1400.

Two or more destinations of the vehicle 100 may be set. If two or more destinations of the vehicle 100 is set, the controller 170 may determine that there are one final destination and one or more waypoints. In this case, the vehicle 100 may reach one or more waypoints sequentially and then move to the final destination.

Information about the preset destination of the vehicle 100 may be destination information. For example, destination information may indicate a waypoint and a final destination. According to a user input with regard to a destination, received through the user interface device 200, the controller 170 may store destination information in the memory 140.

In the case where the vehicle 100 reaches a waypoint and is stopped there for a certain period of time, there may be a location at which it is convenient for the vehicle 100 to move to a next destination. For example, suppose that a first stopping location can be reached without making a U-turn, that a second stopping location can be reached by making a U-turn, and that a next destination is at a location that can be reached by making a U-turn. In this case, if the vehicle 100 is stopped at the first stopping location, it is necessary to make a U-turn to reach the next location. On the other hand, if the vehicle 100 is stopped at the second stopping location, it is not necessary to make an additional U-turn to reach the next destination. Thus, the second stopping location may be a location at which the vehicle 100 is able to relatively easily and conveniently move to the next destination.

In an example shown in FIG. 19, the controller 170 may determine, based on destination information, that a waypoint 1500a and a next destination 1500b are set. If it is determined that the destination 1500b after stopping is set, the controller 170 may search, based on map information and destination information, for an area which is adjacent to a lane toward the destination 1500b within a found available stopping area 1100a. Based on the map information and the destination information, the controller 170 may determine that the area adjacent to a lane toward the destination 1500b within the available stopping area 1100a is an available stopping area present in a lane on the right side of the roadway. In this case, a user needs to move to the waypoint 1500a or move from the waypoint 1500a to the vehicle 100, and thus, the controller 170 may determine that an area closest to a crosswalk within the available stopping area 1100a is a recommended area.

Figure 20:
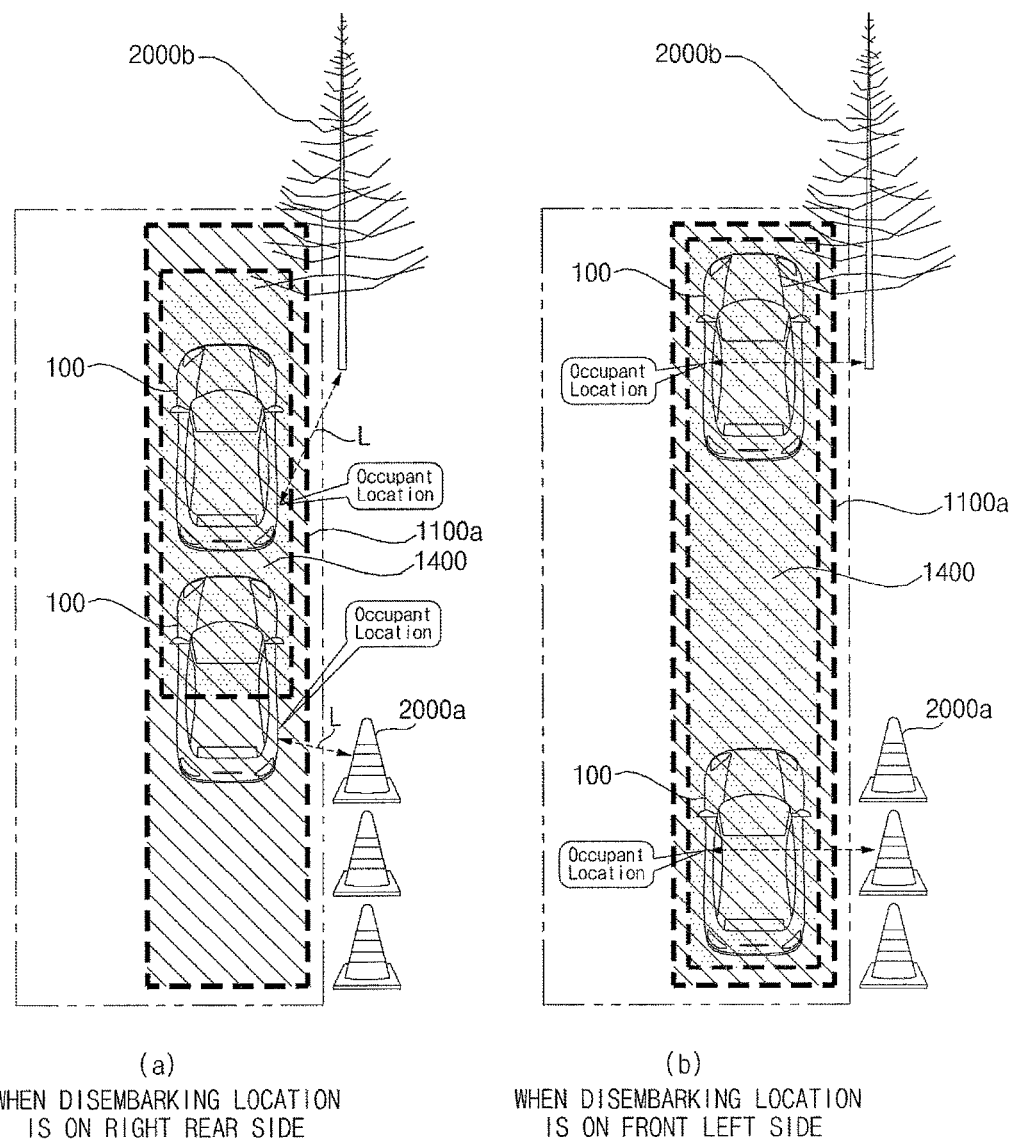
FIG. 20 is a diagram illustrating an example vehicle that determines whether a particular area is a recommended area based on an occupant disembarking location.

FIG. 20 illustrates an example vehicle that determines whether a particular area is a recommended area based on an occupant disembarking location.

The controller 170 may determine an occupant disembarking location based on occupant location information. For example, the occupant disembarking location represents a drop-off location at which an occupant of a vehicle gets off the vehicle.

The occupant location information is information that indicates a location of an occupant inside the vehicle 100. For example, the occupant location information may indicate that an occupant is located at a driver's seat or a right rear seat in the vehicle 100. Vehicle driving information may include the occupant location information. The controller 170 may acquire the occupant location information using the occupant sensing unit 240.

Based on the occupant location information, the controller 170 may determine an occupant disembarking location. For example, if an occupant is located at a right rear seat, the controller 170 may determine that an occupant disembarking location is on the right rear side.

In an example (a) shown in FIG. 20, the controller 170 may determine, based on occupant location information, that an occupant disembarking location is on the right rear side.

In an example (b) shown in FIG. 20, the controller 170 may determine, based on occupant location information, that an occupant disembarking location is on the left front side.

Based on object information, the controller 170 may determine that an area in a found available stopping area 1100a in which any structure 2000a or 200b does not exists within a set disembarking distance from the occupant disembarking location is a recommended area 1400.

The set disembarking distance may be a distance that is required to disembark a passenger from the vehicle 100. For example, the set disembarking distance may be a distance that is required to fully open a door of the vehicle 100. The set disembarking distance may be determined through experiments or may be set by a user.

A structure may be a street tree, a traffic sign plate, an obstacle, a wall, and any other object of certain volume.

In an example (a) shown in FIG. 20, the controller 170 may determine, based on object information, an area 1400 in a found available stopping area 1100a in which a street tree 2000b or a traffic corn 2000a does not exist within a set disembarking distance from the right rear occupant disembarking location. If an occupant disembarking location is on the right rear side and it is determined that the traffic corn 200a exists within the set disembarking distance from the right rear occupant disembarking location, the controller 170 may determine that an area in which the vehicle 100 is now positioned is not a recommended area. If any structure does not exit around the right rear occupant disembarking location, the controller 170 may determine that an area where the vehicle 100 is not positioned is a recommended area 1400, although the street tree 2000b is located on the right-side front of the vehicle 100. The controller 170 may determine that the area 1400 in the available stopping area 1100a, in which the street tree 2000b or the traffic corn 2000a does not exist within the set disembarking distance from the right rear occupant disembarking location, is a recommended area.

In an example (b) shown in FIG. 20, the controller 170 may determine, based on object information, an area 1400 in the found available stopping area 1100a in which the street tree 2000b or the traffic corn 2000a does not exists within a set disembarking distance from the left front occupant disembarking location. If an occupant disembarking location is on the left front side and any structure 2000a or 200b exists on the right side of the vehicle 100, the controller 170 may determine that any structure 2000a or 2000b does not exists within a set disembarking distance from the occupant disembarking location. Because a structure 2000a or 2000b is located on the right side of the available stopping area 1100a and the occupant disembarking location is on the left side, the controller 170 may determine that the whole available stopping area 1100a is a recommended area 1400.

Figure 21:
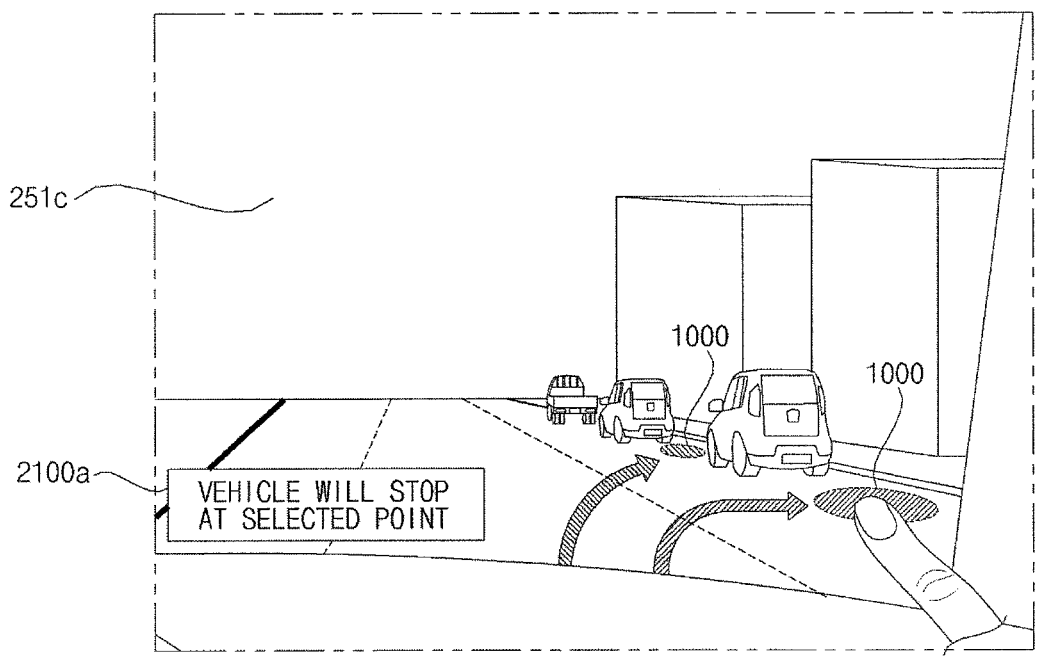
FIG. 21 is a diagram illustrating an example vehicle that stops at a particular location selected by a user.

FIG. 21 illustrates an example vehicle that stops at a particular location selected by a user.

If a user selection of a specific point in a found available stopping area 1000 is received, the controller 170 may control the vehicle 100 to stop at the specific point corresponding to the user selection.

The controller 170 may display the available stopping area 1000 in augmented reality (AR) through a transparent display implemented in the windshield 251c or through an HUD.

The controller 170 may display, on the windshield 251c, a notification 2100b that the vehicle 100 will stop at a point selected by the user.

In response to reception of a user input which selects a specific point in the available stopping area 1000 displayed on the windshield, the controller 170 may control the vehicle 100 to stop at the specific point selected by the user. A specific point corresponding to the user's selection is the specific point selected by the user.

In this case, the input unit 210 of the user interface device 200 may be a device that receives a user input of touching the windshield 251c.

The controller 170 may control the vehicle drive device 600 so that the vehicle 100 moves to a point corresponding to the user's selection.

Figure 22:
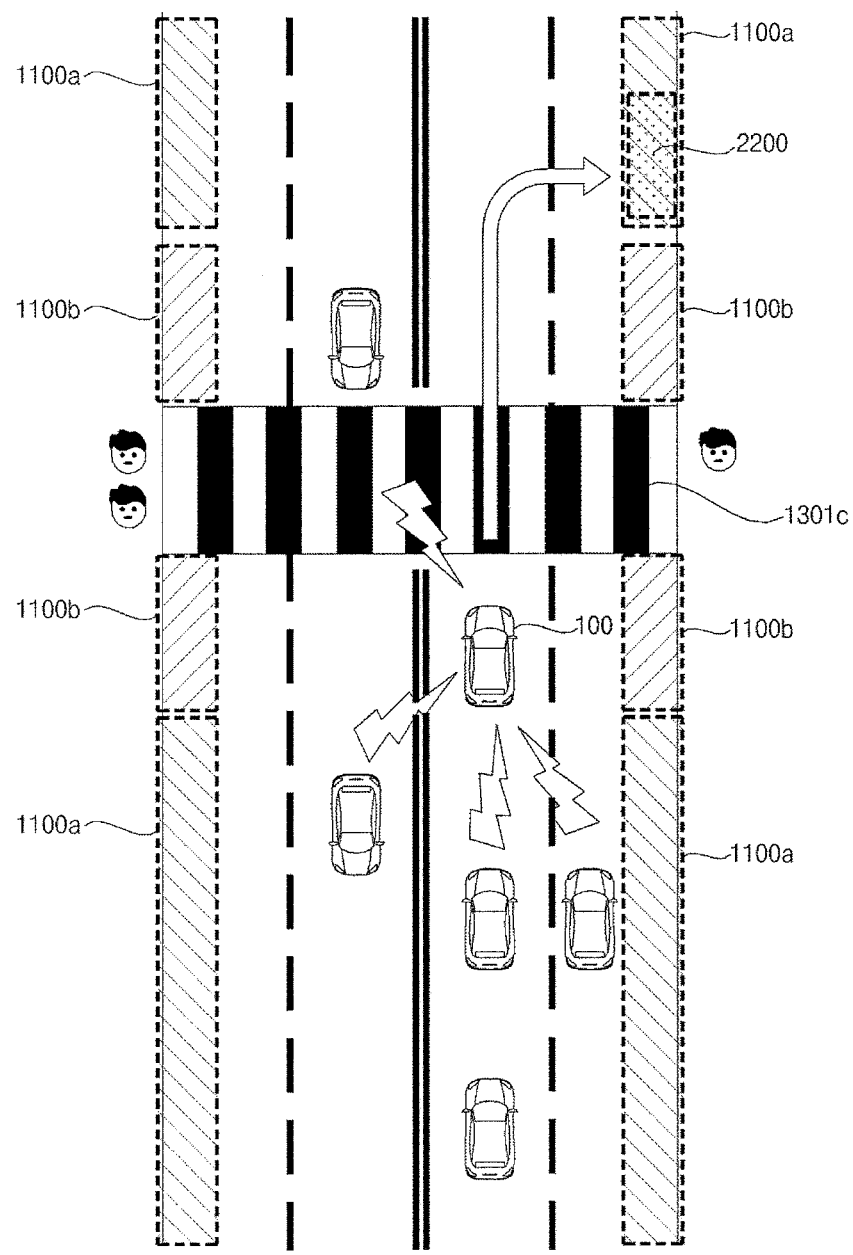
FIG. 22 is a diagram illustrating an example vehicle that transmits information about a stopping location.

FIG. 22 illustrates an example vehicle that transmits information about a stopping location.

Using the communication device 400, the controller 170 may transmit information on a point at which the vehicle 100 will stop.

In response to a user input that selects the specific point 2200 in an available stopping area 1100a, the controller 170 may control the vehicle 100 to stop at a specific point 2200 which is selected according to the user input. If the point 2200 at which the vehicle 100 will stop is determined, the controller 170 may transmit information about the point 2200.

The information about the point 2200 may include information about a location of the point 2200 and information about a stop period of the vehicle 100.

The controller 170 may transmit information about the point 2200 in a broadcasting manner. In this case, a communication device within a specific distance from the vehicle 100 may receive the information about the point 2200.

Figure 23:
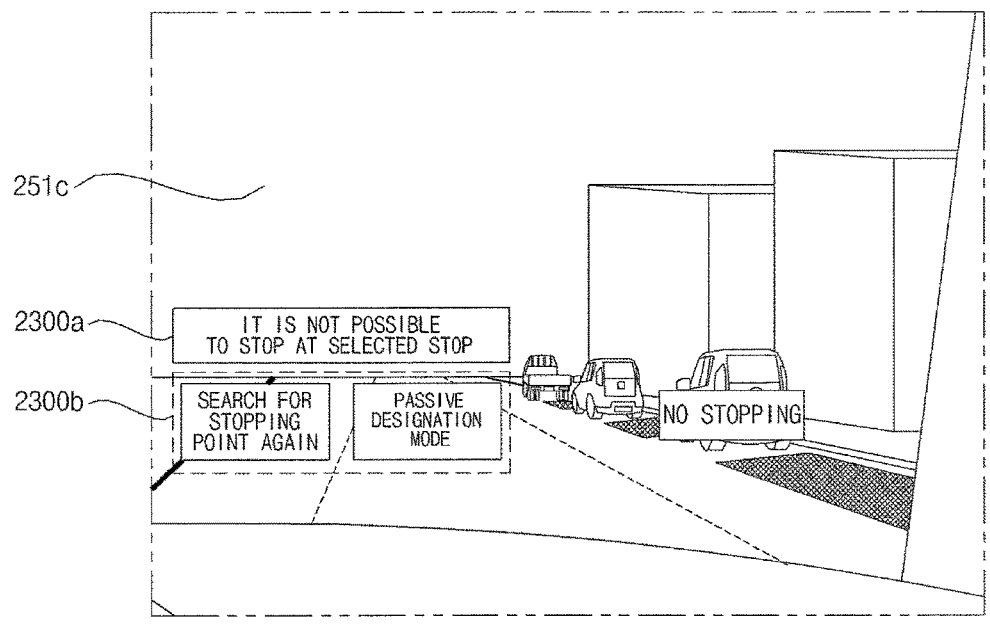
FIG. 23 is a diagram illustrating an example vehicle that provides a notification to a user in a state in which the vehicle is not allowed to stop at a specific point selected by the user.
Figure 23:
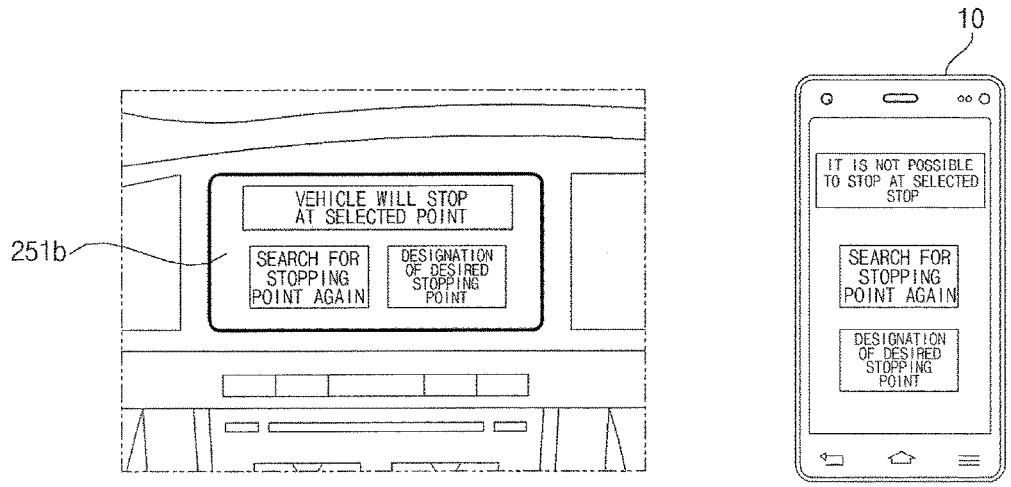

FIG. 23 illustrates an example vehicle that provides a notification to a user in a state in which the vehicle is not allowed to stop at a specific point selected by the user.

If it is determined during travelling of the vehicle 100 to a specific point selected by a user, based on vehicle driving information, that the vehicle 100 is not allowed to stop at the specific point, the controller 170 may output a stopping menu 2300b through the user interface device 200.

For example, if a nearby vehicle stops at a point desired by the vehicle 100, the controller 170 may determine, based on object information included in vehicle driving information, that the vehicle 100 is not allowed to stop at a point selected by a user.

If it is determined that the vehicle 100 is not allowed to stop at the point selected by the user, the controller 170 may output the stopping menu 2300b through the user interface device 200.

The stopping menu 2300b is a menu using which a user is able to searching for a stopping location again or to directly designate a desired stopping location. The controller 170 may display a stopping menu on the display unit 251 or output the same to the sound output unit 252. Hereinafter, description will be confined largely to displaying a stopping menu on the display unit 251.

In an example (a) shown in FIG. 23, the controller 170 may display the stopping menu 2300b on a display unit implemented in the windshield 251c. The controller 170 may further display a notification 2300a indicating that the vehicle 100 cannot stop at a selected point. The stopping menu 2300b may include a button for searching for a stopping location again, and a button for selecting a passive designation mode which allows a user to designate a desired stopping location.

In an example (b) shown in FIG. 23, the controller 170 may display, on the display unit 251 provided inside the vehicle 100, a button for searching a stopping location again and a button for designating a desired stopping location. The controller 170 may further display, on the display unit 251b, a notification indicating that the vehicle 100 cannot stop at a selected point.

In the example (b) shown in FIG. 23, the controller 170 may transmit a stopping menu to a preset terminal 10. In this case, a button for searching for a stopping location again and a button for designating a desired stopping location may be displayed in the terminal 10.

The button for selecting a passive designation mode, shown in the example (a) shown in FIG. 23, may perform the same function as that of the button for designating a desired stopping location, which is shown in the example (b) shown in FIG. 23.

In response to a first user input corresponding to a stopping menu, the controller 170 may search for an available stopping area or a recommended area again or may enter a passive designation mode.

The first user input is an input that selects either the button for searching for a stopping location again or the button for selecting a passive designation mode. In response to the first user input, the controller 170 may search for an available stopping area or a recommended area again or may enter a passive designation mode. Hereinafter, how to search for an available stopping area and designate a desired stopping location is described in detail with reference to FIGS. 24 and 25.

Figure 24:
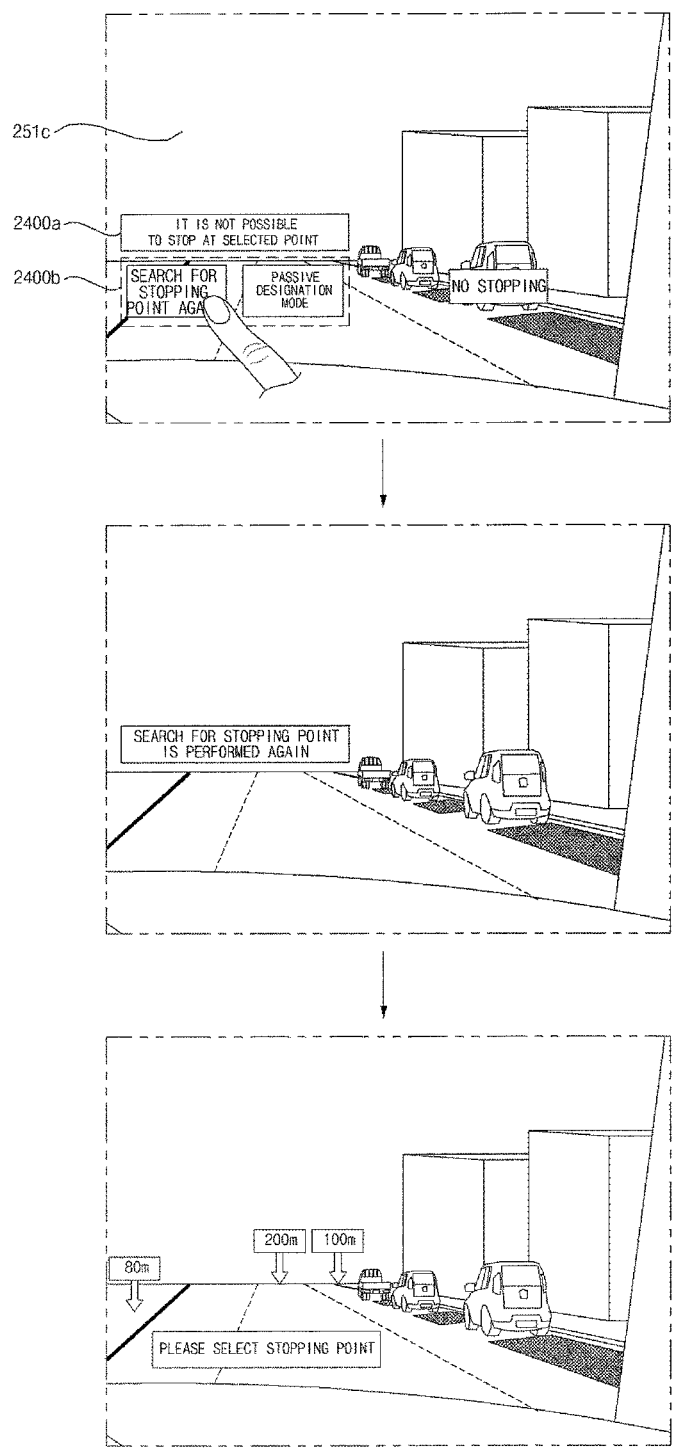
FIG. 24 is a diagram illustrating an example vehicle that searches a new stopping location.

FIG. 24 illustrates an example vehicle that searches a new stopping location.

According to a first user input that selects to search for a stopping location again, the controller 170 may search for an available stopping area again.

If a user input is applied to the button for searching for a stopping location again, the button which is displayed on the windshield 251c, the controller 170 may search for an available stopping area again based on vehicle driving information.

While searching for an available stopping area again, the controller 170 may display, on the windshield 251c, a notification indicating that a search for a stopping area is being performed again.

If at least one available stopping area is found, the controller 170 may display, on the windshield 251c, information about the found available stopping area.

The information about the found available stopping area may include an image of arrow aiming at a location of the available stopping area, and a distance to the available stopping area.

If a user touches a specific point in the available stopping area displayed on the windshield 251c, the controller 170 may control the vehicle 100 to stop at the point touched by the user.

Figure 25:
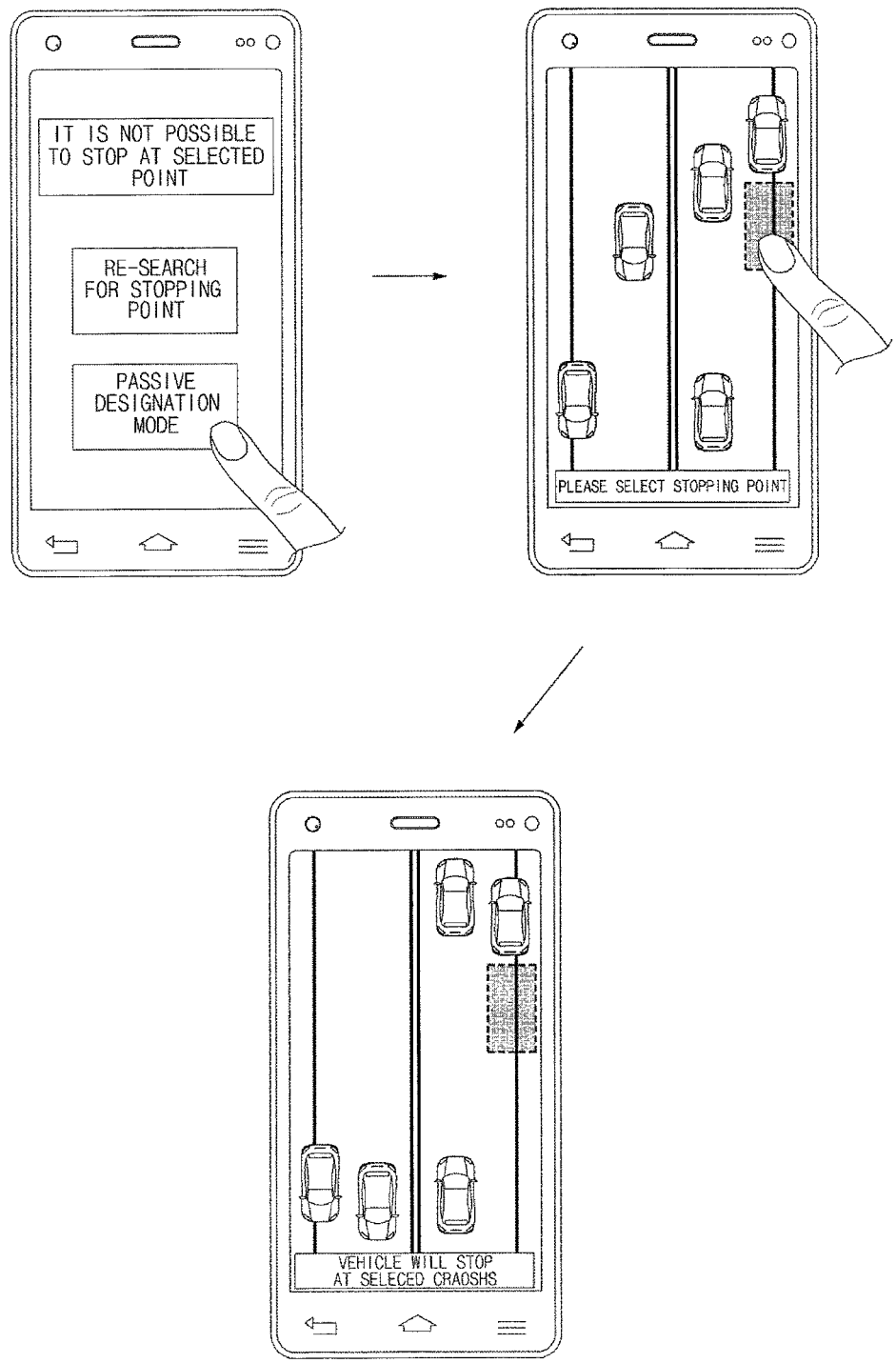
FIG. 25 is a diagram illustrating an example vehicle that moves to a location assigned by a user.

FIG. 25 illustrates an example vehicle that moves to a location assigned by a user.

The controller 170 may display a stopping menu on the display unit 251 or transmit the same to a preset terminal 10. The preset terminal 10 may be a terminal of a user who is within the vehicle 100. In this case, a button for searching for a stopping location again and a button for directly designating a stopping location may be displayed in the terminal 10.

If the button for designating a desired stopping location is selected, the terminal 10 may transmit a signal corresponding to a first user input that selects to designate a desired stopping location to the controller 170 of the vehicle 100. If the signal corresponding to the first user input is received from the terminal 10, the controller 170 may determine that the first user input is received through the user interface device 200.

If a first user input that selects to designate a desired stopping location is received, the controller 170 may enter a passive designation mode. Upon entrance to the passive designating mode, the controller 170 may control the vehicle 100 to stop at a point selected by a user, without determining whether it is possible to stop at the selected point.

If a first user input which selects to designate a desired stopping location is received, the controller 170 may display a top-view image, which is used to designate a stopping location, on the display unit 251 or transmit such a top-view image to a terminal 10. If a first user input which selects to designate a desired stopping location is received from the terminal 10, the controller 170 may display a top-view image, which is used to designate a desired stopping location, to the terminal 10. In this case, the terminal 10 may display the top-view image.

If a second user input which selects a stopping location on the top-view image is received, the terminal 10 may transmit the received user input to the controller 170. Upon entrance to a passive designation mode, the controller 170 may control the vehicle 100 to stop at a point selected according to a second user input. The second user input is a user input that selects a stopping location.

The controller 170 may transmit, to the terminal 10, a top-view image showing that the vehicle 100 will stop at the point selected by a user. The terminal 10 may display the top-view image transmitted by the controller 170.

Figure 26:
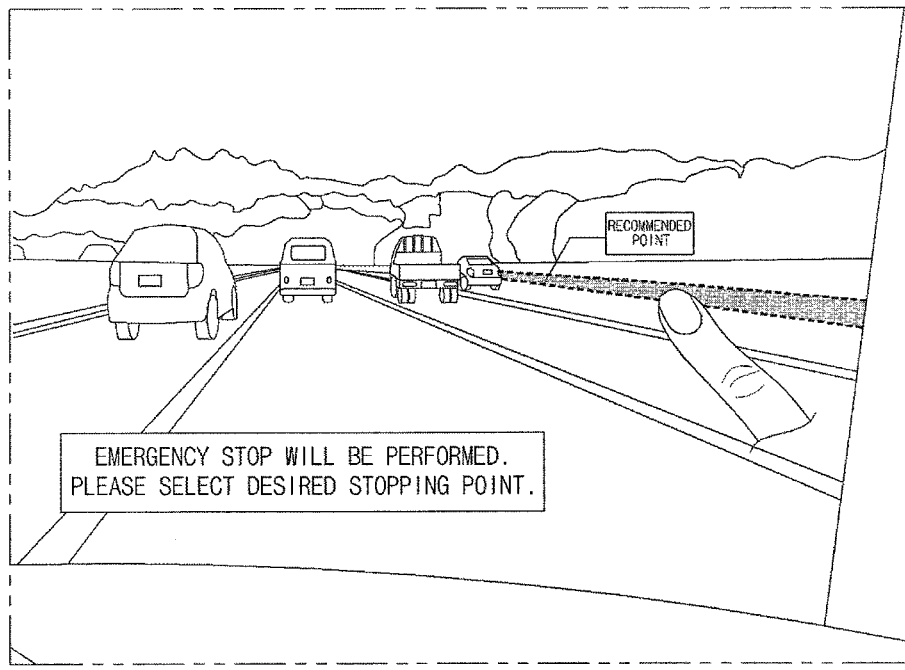
FIG. 26 is a diagram illustrating an example vehicle that performs an emergency stop at a location selected by a user.
Figure 26:
Figure 26:
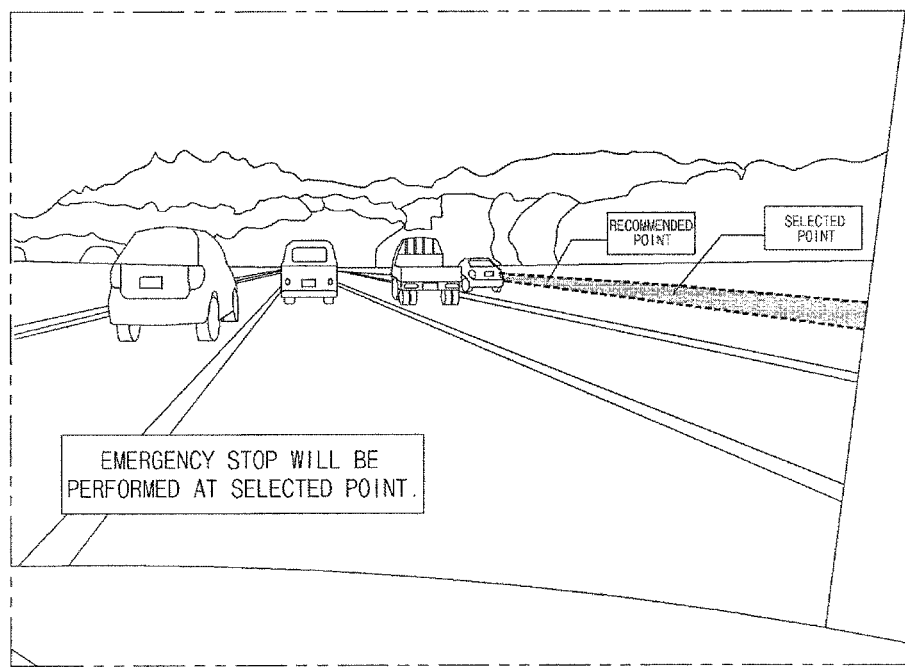

FIG. 26 illustrates an example vehicle that performs an emergency stop at a location selected by a user.

If a request for emergency stop is received through the user interface device 200 during travelling of the vehicle 100, the controller 170 may determine, based on vehicle driving information, that an area for the vehicle 100 to enter and stop is an available stopping area.

Based on the vehicle driving information, the controller 170 may determine a recommended area in the available stopping area. For example, based on vehicle driving information, the controller 170 may determine the current speed of the vehicle 100, and a location, a speed, and a travel path of a nearby vehicle. Then, the controller 170 may determine that an area having the lowest probability of collision between the vehicle 100 and an object is a recommended area.

The controller 170 may display information about an available stopping area or a recommended area on the display unit 251 or transmit the same to a preset terminal.

The controller 170 may display a stopping allowed rea and a recommended area 2600b on the windshield 251c. The controller 170 may further display, on the windshield 251c, a notification 2600a indicating that the vehicle 100 will perform an emergency stop.

In response to a received user input that selects a stopping location, the controller 170 may stop the vehicle 100 at the selected stopping location.

The controller 170 may display, on the display unit 251c provided in a windshield, a marker 2600c that indicates the point selected by a user.

Figure 27:
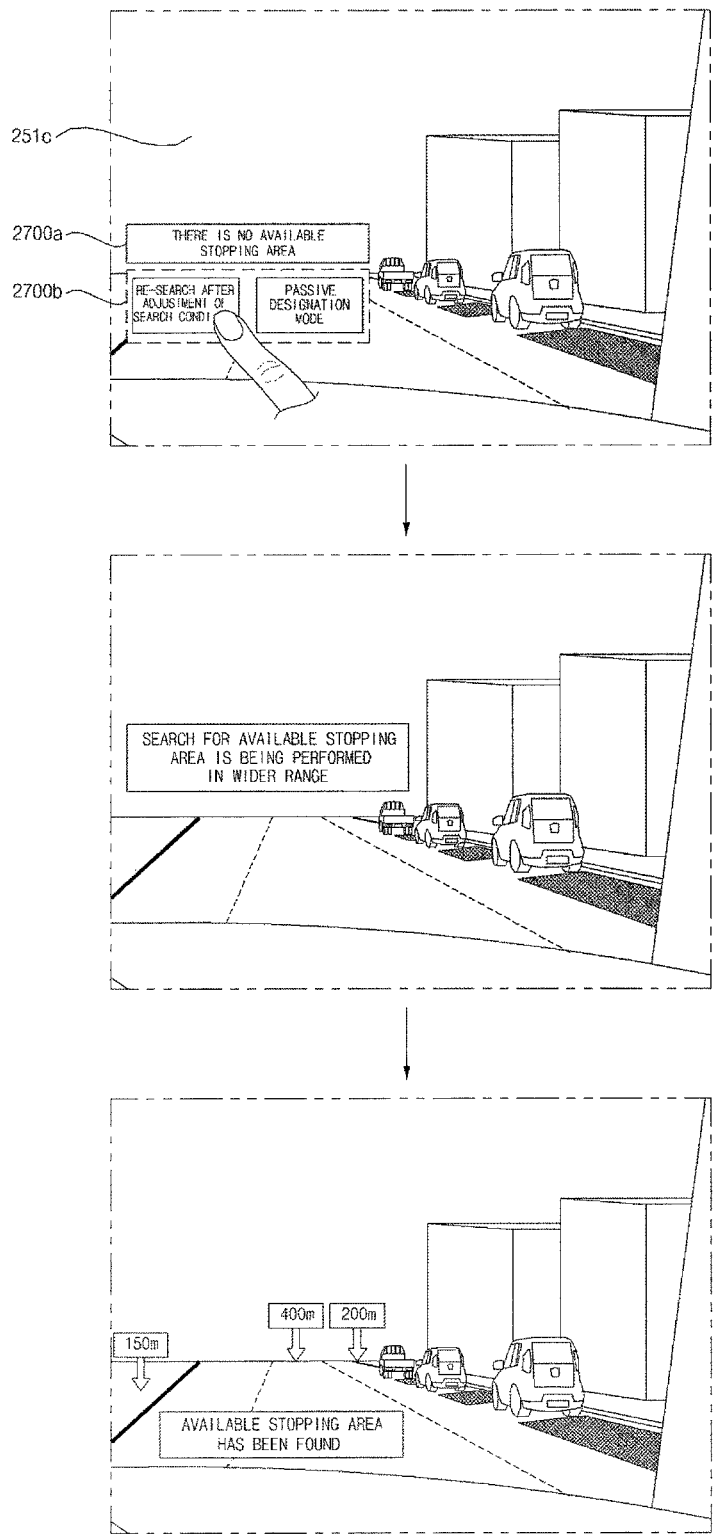
FIG. 27 is a diagram illustrating an example vehicle that searches a new available stopping area.

FIG. 27 illustrates an example vehicle that searches a new available stopping area.

If it is determined that no available stopping area exists, the controller 170 may output a stopping menu 2700b through the user interface device 200.

The controller 170 may display, on the display unit 251cc implemented in a windshield, a stopping menu 2700b and a notification 2700a indicating that there is no available stopping area.

The stopping menu 2700b may include may include a button for searching for an available stopping area again after adjusting a search condition, and a button for selecting a passive designation mode which allows a user to designates a desired stopping location.

In response to a first user input corresponding to the stopping menu, the controller 170 may search for an available stopping area again after adjusting a search condition or may enter a passive designation mode.

The first user input may be a user input that selects either the button for searching for an available stopping area again after adjusting a search condition or the button for selecting a passive designation mode.

In response to a first user input that selects the button for searching for a stopping available area again after adjusting a search condition, the controller 170 may search for an available stopping area again after adjusting a search condition.

The search condition may be a condition that is preset to search for an available stopping area. For example, the controller 170 may search for an available stopping area within a set distance from the vehicle 100. In this case, a search condition may be the set distance that limits a search range. The set distance may be set by a user.

The controller 170 may search for an available stopping area again after increasing a search range included in a search condition. For example, if an existing search range is 100 meter from the vehicle 100, the controller 170 may adjust the search range to 400 meter from the vehicle 100 and then search for an available stopping area. The controller 170 may display, on the display unit 251c implemented in a windshield, a notification indicating that a search for an available stopping area is being performed in a wider range.

The controller 170 may display, on the windshield, location and distance information of a found available stopping area.

In response to a user input that selects the button for a passive designation mode, the controller 170 may enter the passive designation mode.

Upon entrance to the passive designation mode, the controller 170 may control the vehicle 100 to stop at a point selected according to a user input. Upon entrance to the passive designation mode, the controller 170 may display a top-view image, in which the vehicle 100, a map, and any object sensed around the vehicle 100 are indicated, on the display unit 251 or transmit such a top-view image to a preset terminal. The top-view image is an image using which a user is able to select a stopping location. If the user selects a specific point on the top-view image, the controller 170 may control the vehicle 100 to stop at the selected point.

Figure 28:
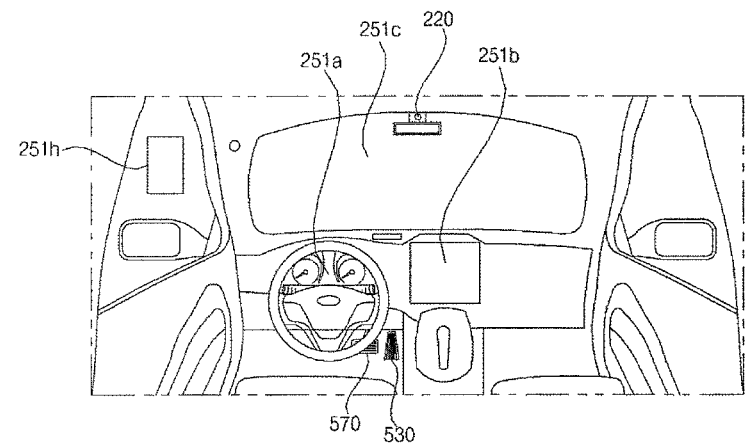
FIG. 28 is a diagram illustrating an example vehicle that displays an available stopping area for one or more occupants of the vehicle.
Figure 28:
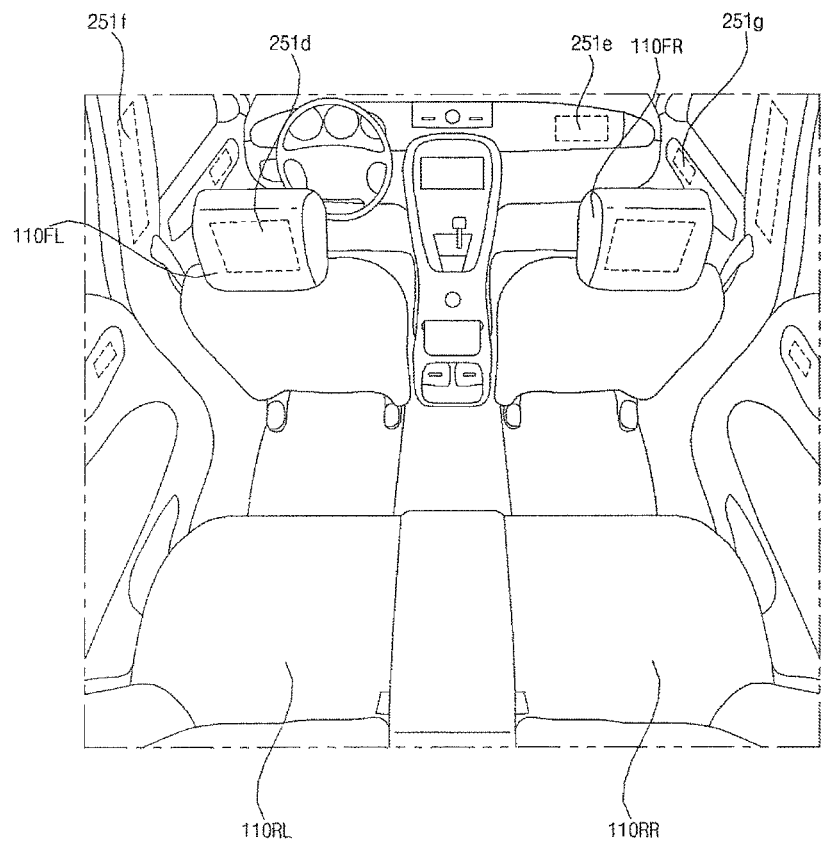

FIG. 28 illustrates an example vehicle that displays an available stopping area for one or more occupants of the vehicle.

The display unit 251 provided in the vehicle 100 may include at least one of a transparent display, a Head Up Display (HUD), a Center Information Display (CID) 251b, a front passenger display 251e, and a Rear Seat Entertainment (RSE) 251d. The transparent display and the HUD may be implemented in the same windshield 251c or the window 251h.

The controller 170 may determine a location of an occupant inside the vehicle 100 by using the occupant sensing unit 240, and display a found available stopping area on any one selected among the transparent display, the HUD, the CID 251b, the front passenger display 251e, and the RSE 251d according to which corresponds to the location of the occupant.

A variety of the display unit 251 provided in the vehicle 100 may correspond to occupant seats 110FL, 110FR, 110RL, and 110RR.

For example, if an occupant is located at the driver' seat 110FL, the controller 170 may display an available stopping area in at least one of a transparent display/HUD implemented in the windshield and the CID 251b.

For example, if an occupant is located at the right rear seat 110RR or the left rear seat 110RL, the controller 170 may display an available stopping area on the RSE 251d provided in front of each of those seats.

For example, if an occupant is located at the front passenger seat 110FR, the controller 170 may display an available stopping area on the front passenger display 251e or the CID 251b.

In the case of displaying a found available stopping area on the transparent display or the HUD, the controller 170 may display the found available stopping area in augmented reality (AR).

In the case of displaying a found available stopping area in one of the CID 251b, the front passenger display 251e, and the RSE 251d, the controller 170 may display a top-view image in which the available stopping area is indicated.

Figure 29:
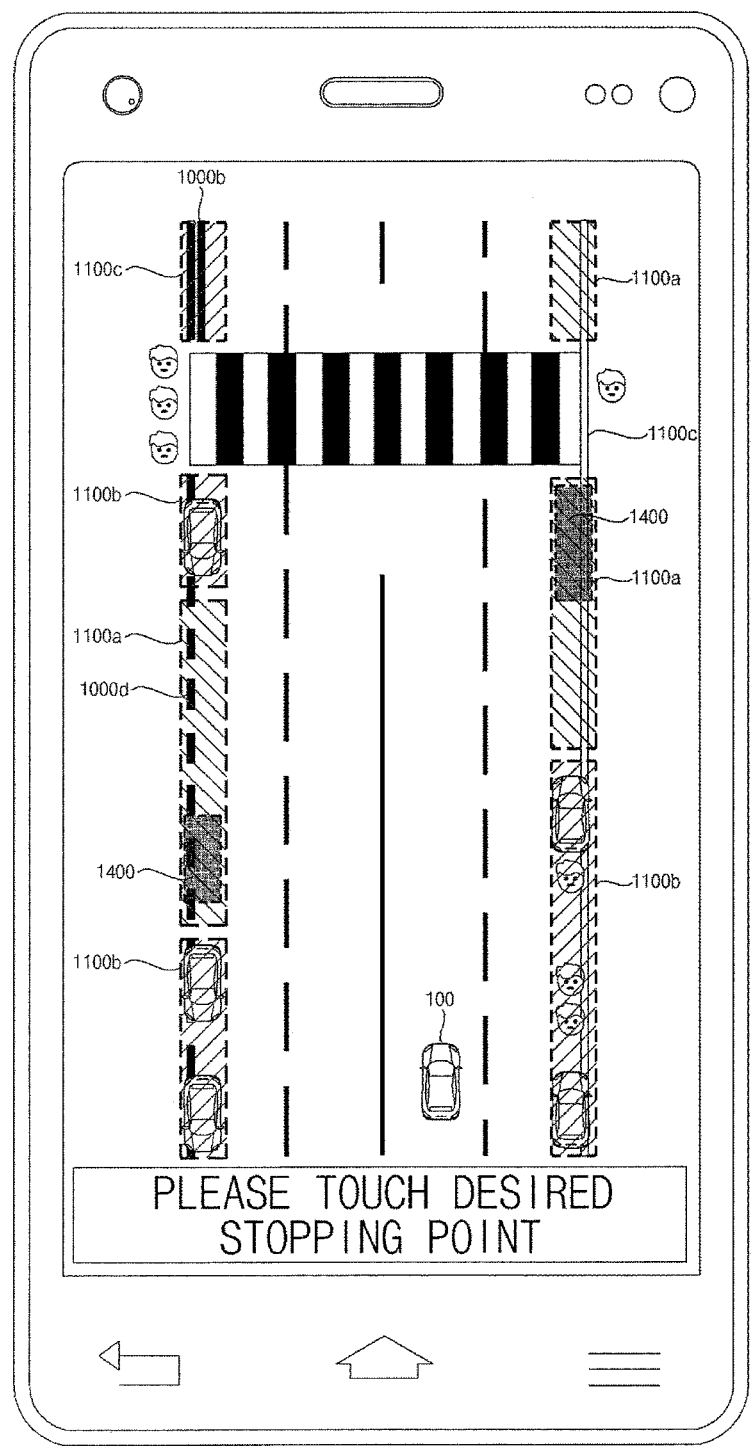
FIG. 29 is a diagram illustrating an example terminal that receives an available stopping area from a vehicle.

FIG. 29 illustrates an example terminal that receives an available stopping area from a vehicle.

If it is determined, using the occupant sensing unit 240, that an occupant is located at a rear seat in the vehicle 100 or that no occupant exists inside the vehicle 100, the controller 170 may transmit a top-view image, in which a found available stopping area is indicated, to a preset terminal through the communication device 400.

The preset terminal 10 may be a user's terminal. The user's terminal 10 may perform communication with the controller 170 through the communication device 400. The terminal 10 may display a top-view image transmitted by the controller 170.

The terminal 10 may display a top-view image which contains the vehicle 100, an object sensed by the object detection device 300, an available stopping area 1100a, an unavailable stopping area 1100b, and a recommended area 1400.

If a user input which selects a specific point in the available stopping area 1100a is received, the terminal 10 may transmit the user input to the controller 170.

In response to the user input transmitted by the preset terminal 10, the controller 170 may control the vehicle 100 to stop at the selected point.

Accordingly, even a user who is in a rear seat of the vehicle 100 or not inside the vehicle can select a location to stop the vehicle 100.

The examples described above can be modified. In particular, various variations and modifications are possible in the component parts and/or arrangements of the subject combination arrangement within the scope of the disclosure, the drawings and the appended claims. In addition to variations and modifications in the component parts and/or arrangements, any suitable alternatives in the component parts and/or arrangements are possible.

What is claimed is:

1. A vehicle control device that operates in an autonomous driving mode, the vehicle control device comprising:
a controller that is configured to:
obtain vehicle driving information of a vehicle,
in a state in which (i) the vehicle moves within a first distance from a destination or (ii) the vehicle receives a stop request while the vehicle is travelling, search for at least one available stopping area based on the vehicle driving information, and
display information about the at least one available stopping area on a display unit or transmit the information to a terminal,
wherein the controller is further configured to:
determine a location of an occupant inside the vehicle, and
display the information about the at least one available stopping area on any one selected display inside the vehicle according to which display corresponds to the location of the occupant inside the vehicle.

2. The vehicle control device of claim 1, further comprising:
an object detection device that is configured to detect object information that represents information about one or more objects outside the vehicle,
wherein the controller is configured to:
obtain the object information from the object detection device, and
based on the object information, determine whether an area outlined by a parking line or a stopping-allowed line or an area having a space for the vehicle to enter and stop is the at least one available stopping area.

3. The vehicle control device of claim 2, wherein the controller is configured to:
based on the object information, determine (i) whether an area outlined by a parking line or a stopping-allowed line exists, (ii) whether one or more objects are in the area outlined by the parking line or the stopping-allowed line, and (iii) whether the area outlined by the parking line or the stopping-allowed line includes a space for the vehicle to enter and stop, and
based on the determinations (i) to (iii), determine the area outlined by the parking line or the stopping-allowed line is the at least one available stopping area.

4. The vehicle control device of claim 3, further comprising:
a communication device that is configured to receive communication information,
wherein the controller is configured to:
obtain the communication information from the communication device, and
based on the communication information, determine that a first area that is assigned to a first vehicle is not the at least one available stopping area.

5. The vehicle control device of claim 3, wherein the vehicle driving information includes map information and regulation information, and
wherein the controller is configured to:
based on at least one of the object information, the map information, and the regulation information, determine whether a second area that is within a second distance from a restricted area including at least one of an illegal stopping area, a bus stop, a taxi stand, a subway station, a train station, an intersection, a ramp, a traffic structure, and an access road is not the at least one available stopping area.

6. The vehicle control device of claim 2, wherein the controller is configured to:
determine a recommended area from the at least one available stopping area based on the vehicle driving information, and transmit information about the recommended area to the display unit or the terminal.

7. The vehicle control device of claim 6, wherein the vehicle driving information includes map information,
wherein the controller is configured to:
based on the map information, determine a respective distance between each of at least one available stopping area and the destination, and
based on the distances, determine that a third area having the smallest distance to the destination is the recommended area.

8. The vehicle control device of claim 6, wherein the vehicle driving information includes map information, traffic information, and location information of the vehicle, and
wherein the controller is configured to:
based on at least one of the map information, the traffic information, and the location information of the vehicle, for each of the at least one available stopping area, determine (i) a first time period that represents a time period for the vehicle to stop and (ii) a second time period that represents a time period for a user to move from the available stopping area to the destination, and
based on the respective first time periods and the respective second time periods, determine the recommended area from the at least one available stopping area.

9. The vehicle control device of claim 6, wherein the vehicle driving information includes at least one of object information, nearby vehicle information, and traffic information, and
wherein the controller is configured to:
based on at least one of the object information, the nearby vehicle information, and the traffic information, calculate a safety level for each of the at least one available stopping area, and
based on the respective safety levels, determine the recommended area from the at least one available stopping area.

10. The vehicle control device of claim 9, wherein the controller is configured to:
obtain a first available stopping area from the at least one stopping area,
based on the object information or the nearby vehicle information, determine a probability of collision between the vehicle and one or more objects on a way from a current location of the vehicle to the first available stopping area,
based on the traffic information, determine traffic within a third distance from the first available stopping area, and
based on the probability of collision and the traffic, determine the safety level,
wherein the safety level is inversely proportional to the probability of collision and the traffic.

11. The vehicle control device of claim 6, wherein the vehicle driving information includes stopping type information and object information, and
wherein the controller is configured to:
based on the stopping type information, determine an expected stop duration of the vehicle,
based on the object information, determine a fourth area, from the at least one available stopping area, at which the vehicle is allowed to stop for the expected stop duration, and
determine the fourth area as the recommended area.

12. The vehicle control device of claim 6, wherein the vehicle driving information includes map information and destination information, and
wherein the controller is configured to:
obtain, from the destination information, a first destination that is a destination after stopping at the recommended area,
based on the map information and the destination information, determine a fifth area, from the at least one available stopping area, that is on a route to the first destination from a current location of the vehicle, and
determine the fifth area as the recommended area.

13. The vehicle control device of claim 6, wherein the vehicle driving information includes (i) occupant location information that represents a location of an occupant inside the vehicle and (ii) object information, and
wherein the controller is configured to:
based on the occupant location information, determine an occupant disembarking location that represents a location at which the occupant gets off the vehicle,
based on the object information, determine a sixth area, from the at least one available stopping area, at which no object is located within a fourth distance from the occupant disembarking location, and
determine the sixth area as the recommended area.

14. The vehicle control device of claim 6, wherein the controller is configured to:
receive user input that selects a particular area from the at least one available stopping area, and
in response to receiving the user input, control the vehicle to move and stop at the particular area.

15. The vehicle control device of claim 14, further comprising:
a communication device,
wherein the controller is configured to transmit, through the communication device, information about the particular area.

16. The vehicle control device of claim 14, further comprising:
a user interface device,
wherein the controller is configured to:
during moving to the particular area, based on the vehicle driving information, determine whether the vehicle is not allowed to stop at the particular area,
based on a determination that the vehicle is not allowed to stop at the particular area, output a stopping menu through the user interface device,
receive first user input from the user interface device,
in response to the first user input, (i) search for a new available stopping area or a new recommended area or (ii) switch to a passive designation mode to receive a new stopping area from a user, and
at the passive designation mode, control the vehicle to stop at the new stopping area that is received from the user.

17. The vehicle control device of claim 6, further comprising:
a user interface device,
wherein the controller is configured to:
receive an emergency stop request through the user interface device while the vehicle is travelling,
based on the vehicle driving information, determine one or more areas for the vehicle to enter and stop as the at least one available stopping area, based on the vehicle driving information, determine a recommended area from the at least one available stopping area, provide information about the at least one available stopping area or the recommended area to the display unit or the terminal, receive user input selecting an emergency stopping area from the at least one available stopping area or the recommended area, and control the vehicle to stop at the emergency stopping area.

18. The vehicle control device of claim 1, further comprising:

a user interface device, wherein the controller is configured to:

in a state in which the at least one available stopping area does not exist, output a stopping menu through the user interface device, receive first user input from the stopping menu, in response to the first user input, search for a new available stopping area using a new search condition or switch to a passive designation mode to receive a new stopping area from a user, and at the passive designation mode, control the vehicle to stop at the new stopping area that is received from the user.

19. The vehicle control device of claim 1, further comprising:

an occupant sensing unit; and a display unit, wherein the display unit comprises at least one of a transparent display, a Head Up Display (HUD), a Center Information Display (CID), a front passenger seat display, and a Rear Seat Entertainment (RSE), and wherein the controller is configured to:

determine a location of an occupant inside the vehicle by using the occupant sensing unit;

display the found available stopping area on any one selected among the transparent display, the HUD, the CID, the front passenger seat display, and the RSE according to which correspond to the location of the occupant; and when the found available stopping area is displayed on the transparent display or the HUD, display the found available stopping area in augmented reality (AR), wherein when the found available stopping area is displayed either on the front passenger seat display or on the RSE, the CID displays a top-view image in which the found available stopping area is indicated.

20. The vehicle control device of claim 1, further comprising:

an occupant sensing unit; and a communication device, wherein the controller is configured to:

determine the location of an occupant inside the vehicle using the occupant sensing unit, based on the location of the occupant inside the vehicle, determine whether the occupant is located at a rear seat in the vehicle or an occupant does not exist in the vehicle, based on a determination that the occupant is located at the rear seat in the vehicle or an occupant does not exist in the vehicle, transmit a top-view image of the at least one available stopping area to the terminal through the communication device, and receive, from the terminal, user input selecting a stopping area from the at least one available stopping area, in response to the user input, control the vehicle to stop at the stopping area.

* * * * *